(12) United States Patent
Kim et al.

(10) Patent No.: US 8,571,521 B2
(45) Date of Patent: Oct. 29, 2013

(54) MOBILE TERMINAL AND CONTROLLING METHOD THEREOF

(75) Inventors: Minjoo Kim, Seoul (KR); Isu Byun, Seoul (KR); Jiwoon Kim, Seoul (KR); Sanghyuck Lee, Gyeonggi-do (KR); Inyong Hwang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 13/081,368

(22) Filed: Apr. 6, 2011

(65) Prior Publication Data

US 2012/0046077 A1    Feb. 23, 2012

(30) Foreign Application Priority Data

Aug. 18, 2010 (KR) ........................ 10-2010-0079675

(51) Int. Cl.
*H04M 1/68* (2006.01)
(52) U.S. Cl.
USPC ............. 455/411; 726/16; 726/17; 726/26; 715/764
(58) Field of Classification Search
USPC ............. 455/411; 726/16, 17, 26; 715/764
See application file for complete search history.

(56) References Cited

U.S. PATENT DOCUMENTS

| 7,966,576 B2* | 6/2011 | Dongelmans | 715/822 |
| 2009/0005088 A1 | 1/2009 | Hsu | |
| 2009/0083847 A1 | 3/2009 | Fadell et al. | |
| 2009/0083850 A1* | 3/2009 | Fadell et al. | 726/19 |
| 2009/0149156 A1 | 6/2009 | Yeo | |

FOREIGN PATENT DOCUMENTS

EP    2128782    12/2009

OTHER PUBLICATIONS

European Patent Office Application Serial No. 11006076.1, Search Report dated May 8, 2013, 6 pages.

* cited by examiner

*Primary Examiner* — Amancio Gonzalez
(74) *Attorney, Agent, or Firm* — Lee, Hong, Degerman, Kang & Waimey

(57) ABSTRACT

A method of controlling a mobile terminal by displaying simultaneously a plurality of menu icons comprising at least one restricted use icon and at least one non-restricted use icon; performing a user authentication procedure responsive to user selection of the at least one restricted use icon; and unlocking the mobile terminal responsive to user selection of the at least one non-restricted use icon or responsive to completion of the user authentication procedure.

36 Claims, 14 Drawing Sheets

FIG. 14
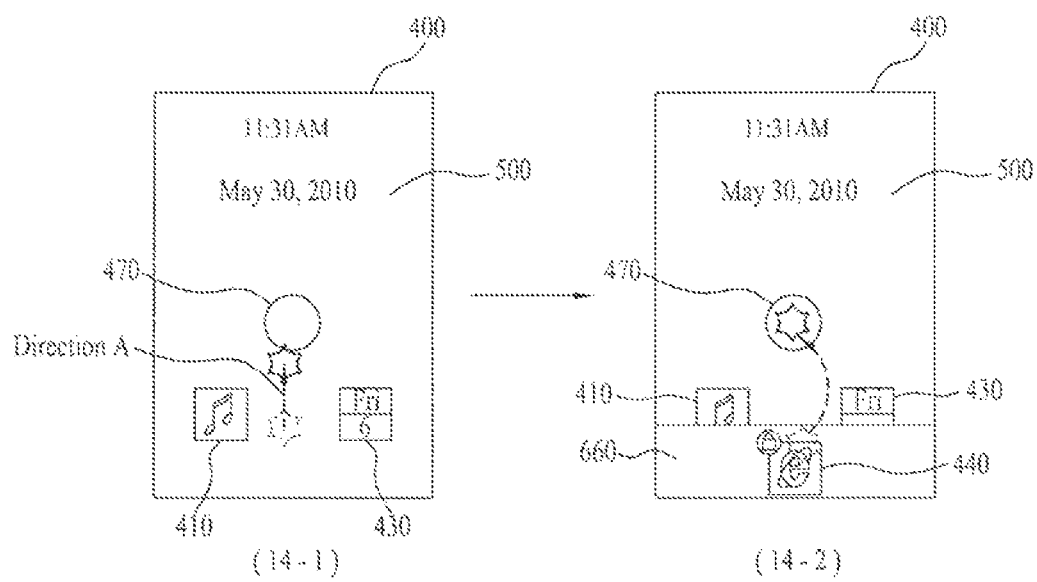
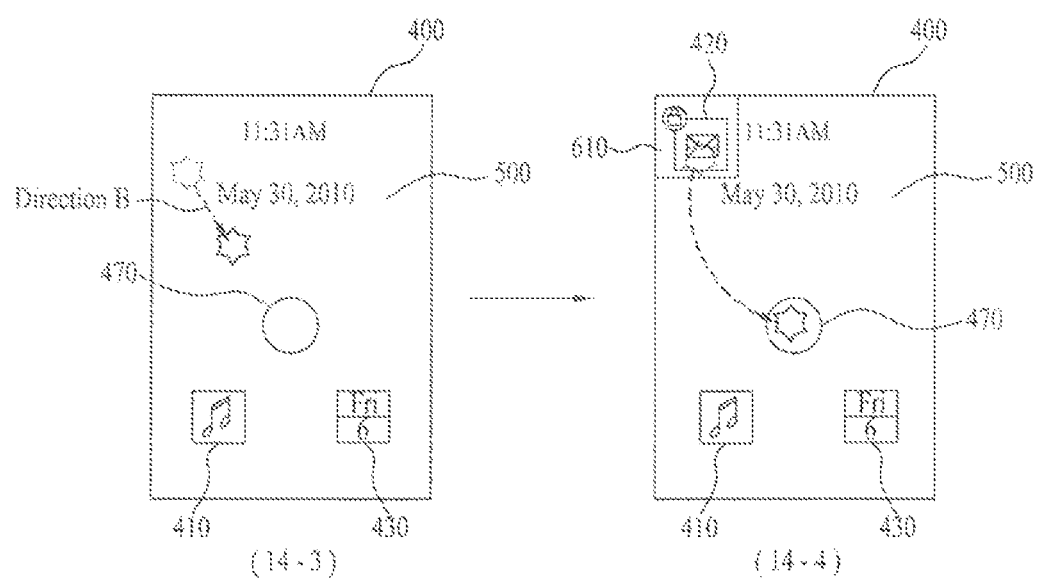

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2010-0079675, filed on Aug. 18, 2010, the contents of which is hereby incorporated by reference herein in its entirety.

FIELD OF THE INVENTION

The present disclosure relates to a mobile terminal, and more particularly, to a mobile terminal and controlling method thereof.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of content, such as video and television programs.

Generally, terminals can be classified as mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

In order to prevent a malfunction or an incorrect manipulation of a mobile terminal or protect a privacy of a terminal user, a lock function can be applied to the mobile terminal. Increasing a terminal user's convenience for unlocking a mobile terminal in a locked state would be desirable.

SUMMARY

Accordingly, the present invention is directed to a mobile terminal and controlling method thereof that substantially obviate one or more problems due to limitations and disadvantages of the related art.

In a first aspect of the present invention, a method of controlling a mobile terminal by displaying simultaneously a plurality of menu icons comprising at least one restricted use icon and at least one non-restricted use icon; performing a user authentication procedure responsive to user selection of the at least one restricted use icon; and unlocking the mobile terminal responsive to user selection of the at least one non-restricted use icon or responsive to completion of the user authentication procedure.

In a second aspect of the present invention, a method of controlling a mobile terminal by displaying a lock screen to indicate the mobile terminal is in a locked state; displaying simultaneously a plurality of menu icons comprising at least one restricted use icon and at least one non-restricted use icon; selecting one of the plurality of menu icons in response to a touch input; determining whether the selected menu icon is the at least one restricted use icon or the at least one non-restricted use icon; performing a user authentication procedure to authenticate a user when the selected menu icon is determined to be the at least one restricted use icon; determining whether the user authentication procedure is complete; and releasing the locked state when the selected menu icon is the at least one non-restricted use icon or the user authentication procedure is complete.

In a third aspect of the present invention, a mobile terminal including a display and a controller configured to display simultaneously on the display a plurality of menu icons comprising at least one restricted use icon and at least one non-restricted use icon, authenticate a user responsive to user selection of the at least one restricted use icon, and unlock the mobile terminal responsive to user selection of the at least one non-restricted use icon or responsive to authentication of the user.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

FIG. 14 is a diagram of display screen configurations for implementing a method of controlling a mobile terminal according to an embodiment of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present disclosure can be applicable to various types of terminals. Examples of such terminals can include mobile terminals, such as mobile phones, user equipment, smart phones, mobile computers, digital broadcast terminals, personal digital assistants, portable multimedia players (PMP) or navigation systems.

Figure 1:
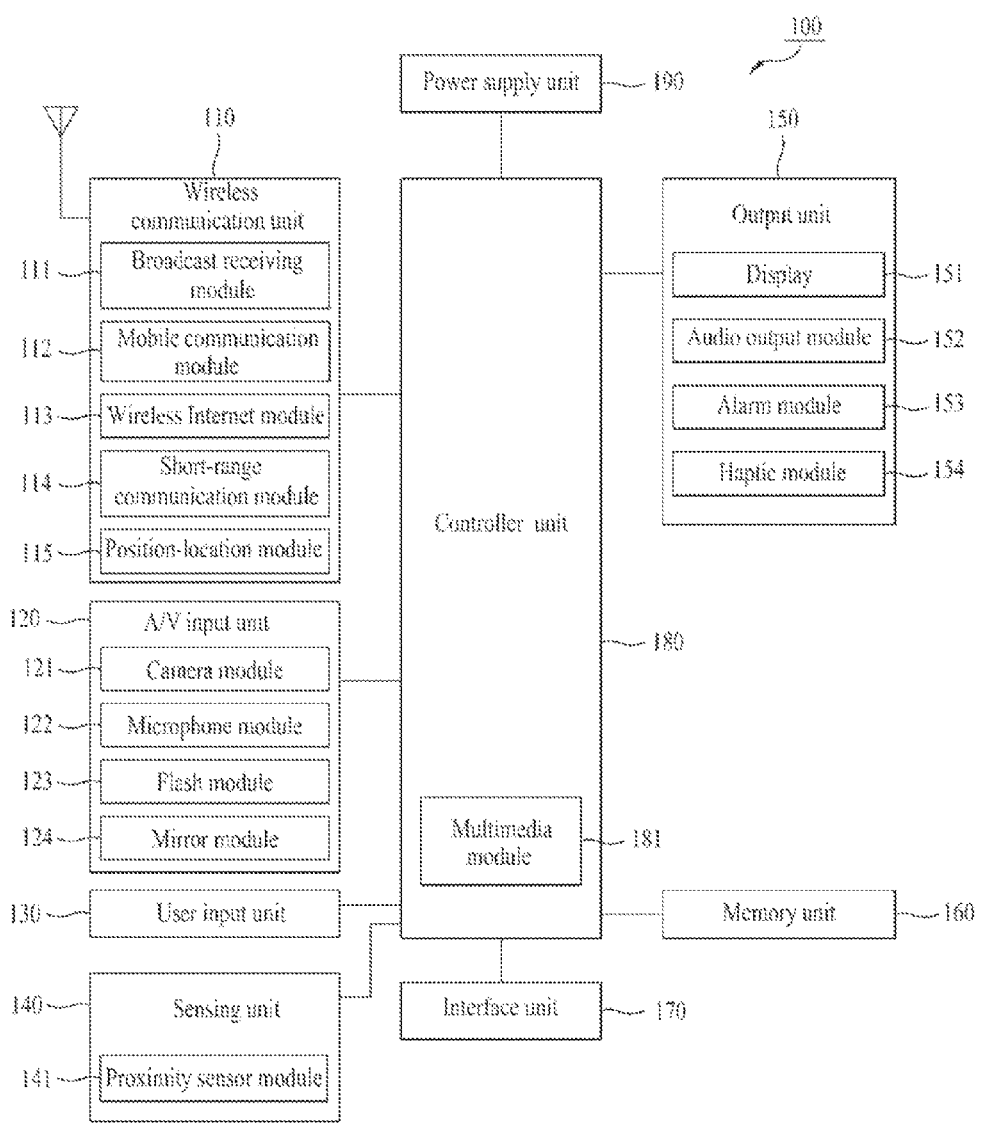
FIG. 1 is a block diagram of a mobile terminal according to an embodiment of the present invention.

Referring to FIG. 1, the mobile terminal 100 may refer to an electronic device among a plurality of external electronic devices on a network according to an embodiment of the present invention, which will be described in more detail with reference to the drawings. The mobile terminal 100 can include a cellular phone, a smart phone, a laptop computer, a digital broadcasting terminal, personal digital assistants (PDA), a portable multimedia player (PMP), or a navigation system.

The mobile terminal 100 according to an embodiment of the present invention includes a wireless communication unit 110, an A/V (audio/video) input unit 120, a user input unit 130, a sensing unit 140, an output unit 150, a memory unit 160, an interface unit 170, a controller unit 180, and a power supply unit 190. The mobile terminal 100 can have various components, but it is understood that implementing all of the illustrated components is not required. Greater or fewer components may alternatively be implemented.

The wireless communication unit 110 can include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server (not shown) via a broadcast channel. The broadcast channel may include a satellite channel and a terrestrial channel.

The broadcast managing server generally refers to a server which generates and transmits the generated broadcast signal and/or broadcast associated information or a server which is provided with a previously generated broadcast signal and/or broadcast associated information and then transmits the provided broadcast signal or information to the mobile terminal 100. The transmitted broadcast signal may be implemented as a television (TV) broadcast signal, a radio broadcast signal, and a data broadcast signal. The transmitted broadcast signal may be combined with a TV or radio broadcast signal.

The broadcast associated information can include information associated with a broadcast channel, a broadcast program, and a broadcast service provider. The broadcast associated information can be provided via a mobile communication network, and be received by the mobile communication module 112 via a broadcast signal antenna 116.

The broadcast associated information can be implemented in various forms. For example, broadcast associated information may include an electronic program guide (EPG) related to digital multimedia broadcasting (DMB) and electronic service guide (ESG) related to digital video broadcast-handheld (DVB-H).

The broadcast receiving module 111 may be configured to receive broadcast signals transmitted from various types of broadcasting systems. The broadcasting systems can include digital multimedia broadcasting-terrestrial (DMB-T), digital multimedia broadcasting-satellite (DMB-S), digital video broadcast-handheld (DVB-H), media forward link only (MediaFLO®) and integrated services digital broadcast-terrestrial (ISDB-T). Greater or fewer broadcasting systems can be received by the broadcast receiving module 111.

The broadcast signal and/or broadcast associated information received by the broadcast receiving module 111 may be stored in a storage device, such as the memory unit 160.

The mobile communication module 112 transmits and receives wireless signals between one or more network entities (e.g., base station, external terminal, and server) via the broadcast signal antenna 116. The transmitted and received wireless signals may represent audio, video, and data signals according to text or multimedia message transmissions.

The wireless Internet module 113 supports Internet access for the mobile terminal 100. The wireless Internet module 113 may be internally or externally coupled to the mobile terminal 100. In this case, the wireless Internet technology supported by the wireless Internet module 113 can include Wireless LAN (WLAN), Wireless Fidelity (Wi-Fi™), Wibro (Wireless broadband), World Interoperability for Microwave Access (WiMAX), and High Speed Downlink Packet Access (HSDPA).

The short-range communication module 114 facilitates relatively short-range communications. Suitable technologies for implementing the short-range communication module 114 can include radio frequency identification (RFID), infrared data association (IrDA), ultra-wideband (UWB), Bluetooth® and ZigBee®.

The position information module 115 is a module for identifying or otherwise obtaining a position of the mobile terminal. The position information module 115 can acquire position information using a global navigation satellite system (GNSS). Here, GNSS refers to radio navigation satellite systems that orbit the earth and transmit reference signals so that the location of certain types of radio navigation receivers on the earth's surface can be determined or approximated. GNSS includes a global positioning system (GPS) managed by the USA, Galileo managed by Europe, global orbiting navigational satellite system (GLONASS) managed by Russia, COMPASS managed by China, and quasi-zenith satellite system (QZSS) managed by Japan.

As one representative example of GNSS, the position information module 115 may be a GPS (Global Positioning System) module. The GPS module 115 can calculate information on distances between one point (object) and at least three satellites, information on the time when the distance information is measured, and use the obtained distance information to triangulate three-dimensional position information on the point (object) according to latitude, longitude and altitude at a predetermined time. Moreover, a method of calculating position and time information using three satellites and correcting the calculated position and time information using another satellite can also be used. In addition, the GPS module 115 continuously calculates the current position in real time and calculates velocity information using the position information.

The audio/video (A/V) input unit 120 can be configured to provide audio or video signal input to the mobile terminal 100. The A/V input unit 120 can include a camera module 121, a microphone module 122, a flash module 123 and a mirror module 124. The camera module 121 can receive and process image frames of still pictures (e.g., photographs) obtained by an image sensor when the mobile terminal 100 is in a photographing mode, and alternatively, receive and process moving picture data (e.g., video) when the mobile terminal 100 is in a video call mode. The processed image frames can be displayed by the output unit 150, such as a display module 151.

The image frames processed by the camera module 121 can be stored in the memory unit 160 or can be externally transmitted via the wireless communication unit 110. At least two camera modules 121 can be provided in the mobile terminal 100 depending on the usage environment.

The microphone module 122 receives an external audio signal while the mobile terminal 100 is in a particular mode, such as a phone call mode, a recording mode and a voice recognition mode. The external audio signal is processed and converted into digital audio data. The digital audio data is transformed into a format transmittable to a mobile communication base station via the mobile communication module 112 when the mobile terminal 100 is in a call mode. The microphone module 122 can include assorted noise removing algorithms to remove noise generated when receiving the external audio signal. The flash module 123 can provide lighting in conjunction with the camera module 121 obtaining images of the external environment. The mirror module 124 can provide a user with a reflective surface.

The user input unit 130 generates input data responsive to user manipulation of one or more associated input devices. Examples of such input devices can include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal 100. For example, the sensing unit 140 may detect an open/close status of the mobile terminal 100, a relative positioning of components (e.g., a display and keypad) of the mobile terminal 100, a change of position of the mobile terminal 100 or a component of the mobile terminal 100, a presence or absence of user contact with the mobile terminal 100, or an orientation or acceleration/deceleration of the mobile terminal 100.

In another example, when the mobile terminal 100 is configured as a slide-type mobile terminal, the sensing unit 140 may sense whether a sliding portion of the mobile terminal 100 is open or closed. In another example, the sensing unit 140 can sense the presence or absence of power provided by the power supply unit 190, the presence or absence of a coupling or connection between the interface unit 170 and a device external to the mobile terminal 100. The sensing unit 140 can include a proximity sensor 141.

The output unit 150 generates outputs relevant to senses of sight, hearing, and touch. The output unit 150 can include the display module 151, an audio output module 152, an alarm module 153, a haptic module 154 and an earphone module 156.

The display module 151 can be implemented to visually display or output information associated with the mobile terminal 100. For example, if the mobile terminal 100 is operating in a phone call mode, the display module 151 can provide a user interface (UI) or graphical user interface (GUI) which includes information associated with placing, conducting, and terminating a phone call. In another example, if the mobile terminal 100 is in a video call mode or a photographing mode, the display module 151 may additionally or alternatively display images which are associated with the photographing or video call modes, the UI or the GUI.

The display module 151 may be implemented using one or more display technologies which include a liquid crystal display (LCD), a thin film transistor-liquid crystal display (TFT-LCD), an organic light-emitting diode display (OLED), a flexible display and a three-dimensional (3D) display. Moreover, a transparent display can be implemented using some of the foregoing display technologies in a transparent or optical transmittive type, such as a transparent OLED (TOLED).

A rear configuration of the display module 151 can be implemented in the optical transmittive type as well. In this configuration, a user can see an object at a rear portion of the mobile terminal 100 via an area occupied by the display module 151.

At least two display modules 151 can be provided in the mobile terminal 100. For example, a plurality of display modules 151 can be arranged on a single face of the mobile terminal 100 spaced apart from each other or built into one body. Alternatively, a plurality of display modules 151 can be arranged on different faces of the mobile terminal 100.

If the display module 151 and the sensing unit 140 for detecting a touch action (hereinafter called "touch sensor") are configured as a mutual layer structure (hereinafter called "touchscreen"), the display module 151 can be used as a user input unit 130 as well as an output unit 150. The touch sensor can be configured as a touch film, a touch sheet, or a touchpad.

The touch sensor can be configured to convert a pressure applied to a specific portion of the display module 151 or a variation of a capacitance generated from a specific portion of the display module 151 to an electric input signal. Accordingly, the touch sensor detects a pressure of a touch as well as a touched position or size.

If a touch input is made to the touch sensor, signal(s) corresponding to the touch input is transferred to a touch controller (not shown). The touch controller processes the signal(s) and then transfers the processed signal(s) to the controller unit 180. Therefore, the controller unit 180 can determine whether a prescribed portion of the display module 151 has been touched.

The proximity sensor 141 can be provided to an internal area of the mobile terminal 100 enclosed by the display module 151, such as the touchscreen or around the touchscreen. The proximity sensor 141 is a sensor that detects a presence of an object approaching a prescribed detecting surface or an object existing around the proximity sensor 141 using an electromagnetic field strength or infrared ray without mechanical contact. The proximity sensor 141 can be more durable and more useful than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. If the touchscreen includes the electrostatic capacity proximity sensor, the touchscreen is configured to detect the proximity of a pointer according to a variation in an electric field formed by the proximity of the pointer to the touchscreen. Accordingly, the touchscreen or touch sensor can be classified as the proximity sensor 141.

An action when a pointer approaches without contacting the touchscreen so the pointer is recognized as being located on the touchscreen is defined as "proximity touch." An action when a pointer actually touches the touchscreen is defined as "contact touch." The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, or a proximity touch shift state.). Information corresponding to the detected proximity touch action and the detected proximity touch pattern can be displayed on the touchscreen.

Referring to FIG. 1, the audio output module 152 functions in various modes including a call-receiving mode, a call-placing mode, a recording mode, a voice recognition mode, and a broadcast reception mode in order to output audio data which is received from the wireless communication unit 110 or stored in the memory unit 160. During operation, the audio output module 152 outputs audio relating to a particular function (e.g., call received, message received). The audio output module 152 can be implemented individually or by using one or more speakers, buzzers, and other audio producing devices.

The alarm module 153 outputs a signal for announcing an occurrence of a particular event associated with the mobile terminal 100. Examples of the announced events can include a call received event, a message received event and a touch input received event.

The alarm module 153 can output a signal for announcing the event occurrence by way of vibration as well as via a video or audio signal. The video or audio signal can be output via the display module 151 or the audio output module 152. Hence, the display module 151 or the audio output module 152 can be regarded as a part of the alarm module 153.

The haptic module 154 generates various tactile effects that can be sensed by a user. Vibration is a representative tactile effect generated by the haptic module 154. Strength and pattern of the vibration generated by the haptic module 154 can be controlled. For example, different vibrations can be output simultaneously or sequentially.

The haptic module 154 can generate various tactile effects as well as the vibration. For example, the haptic module 154 generates an effect attributed to the arrangement of pins vertically moving against a contact skin surface, an effect attributed to the injection/suction power of air though an injection/suction hole, an effect attributed to skimming over a skin surface, an effect attributed to the contact with an electrode, an effect attributed to electrostatic force, or an effect attributed to the representation of hold/cold sense using an endothermic or exothermic device.

The haptic module 154 can be implemented to enable a user to sense the tactile effect through a muscle sense of a finger or an arm as well as to transfer the tactile effect through direct contact. At least two haptic modules 154 can be provided in the mobile terminal 100.

Furthermore, the audio output module 152 can output sound through an earphone jack 156. The user can connect earphones to the earphone jack 156 and hear the output sound.

The memory unit 160 can be used to store various types of data to support processing, control, and storage requirements of the mobile terminal 100. Examples of such stored data include program instructions for applications operating on the mobile terminal 100, contact data, phonebook data, messages, audio, still pictures, and moving pictures. The memory unit 160 can also store a recent use history or a cumulative use frequency of each data (e.g., use frequency for each phonebook, each message or each multimedia). Moreover, data for various patterns of vibration and/or sound output can be stored in the memory unit 160 when a touch input to the touchscreen is sensed.

The memory unit 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. Further, the mobile terminal 100 can operate via a web storage entity for performing a storage function of the memory unit 160 on the Internet.

The interface unit 170 can be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and an earphone port.

The identity module (not shown) can be an integrated circuit for storing various types of information for authenticating a use authority of the mobile terminal 100 and can include a User Identify Module (UIM), Subscriber Identify Module (SIM), and Universal Subscriber Identity Module (USIM). A device having the identity module (hereinafter called "identity device") can be manufactured as a smart card. Therefore, the identity device can be connected to the mobile terminal 100 via a corresponding port.

When the mobile terminal 100 is connected to an external cradle, the interface unit 170 provides a passage for supplying power to the mobile terminal 100 from the external cradle or a passage for delivering various command signals input by a user via the external cradle, to the mobile terminal 100. Each of the delivered command signals input via the external cradle or the supplied power can signal that the mobile terminal 100 has been correctly loaded in the external cradle.

The controller unit 180 controls the overall operations of the mobile terminal 100. For example, the controller unit 180 controls and processes voice calls, data communications, and video calls.

The controller unit 180 may include a multimedia module 181 that provides multimedia playback. The multimedia module 181 may be configured as part of the controller unit 180, or implemented as a separate component. Moreover, the controller unit 180 can perform a pattern recognition process for recognizing characters of a written input and images of a picture drawing input carried out on the touchscreen.

The power supply unit 190 provides power used by the various components of the mobile terminal 100. The provided power may be provided internally or externally to the mobile terminal 100.

Various embodiments described herein may be implemented in a computer-readable medium using, for example, computer software, hardware, or some combination thereof. For a hardware implementation, the embodiments described herein may be implemented individually or combined within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. The foregoing embodiments may also be implemented by the controller unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory unit 160, and executed by a controller or processor, such as the controller unit 180.

Figure 2A:
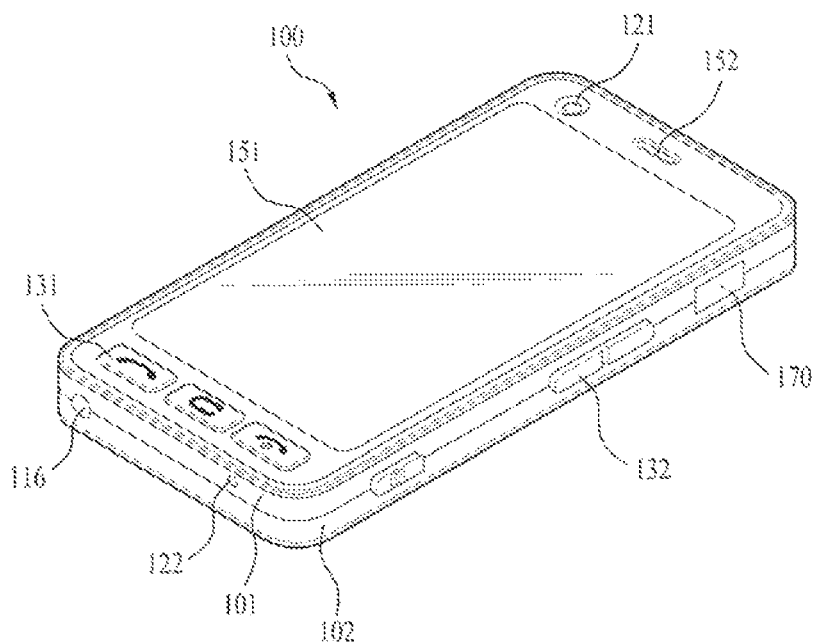
FIG. 2A is a front perspective diagram of a mobile terminal according to one embodiment of the present invention.

FIG. 2A is a perspective diagram of a front side of the mobile terminal 100 according to an embodiment of the present invention. The mobile terminal 100 is configured to have a bar-type terminal body. Yet, the mobile terminal 100 may be implemented in a variety of different configurations. Examples of such configurations include a folder-type, a slide-type, a rotational-type, a swing-type and combinations thereof. For clarity, the remainder of the disclosure will discuss the mobile terminal 100 directed to the bar-type terminal body. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric or electronic parts are loaded in a space provided between the front case 101 and rear case 102. Optionally, at least one middle case can be additionally provided between the front case 101 and rear case 102.

The cases 101 and 102 can be formed by injection molding of synthetic resin or can be formed of metal substances such as stainless steel or titanium.

The front case 101 of the mobile terminal 100 can include the display module 151, the audio output unit 152, a camera module 121, user input units 131 and 132, the microphone module 122, or the interface unit 170.

The display module 151 occupies most of a main face of the front case 101. The audio output unit 151 and the camera module 121 are provided on an area adjacent to one of two end portions of the display module 151, while the user input unit 131 and the microphone module 122 are provided to another area adjacent to the other end portion of the display module 151. The user input unit 132 and the interface unit 170 can be provided on lateral sides of the front case 101 and rear case 102.

The input unit 130 is manipulated to receive a command for controlling an operation of the mobile terminal 100. The input unit 130 can include a plurality of manipulating units 131 and 132. The manipulating units 131 and 132 can be named a manipulating portion and may adopt any mechanism of a tactile manner that enables a user to perform a manipulation action by sensing a tactile feedback.

Content input by the first manipulating unit 131 or second manipulating unit 132 can be diversely set. For instance, commands such as start, end or scroll can be input to the first manipulating unit 131. On the other hand, commands directed to adjusting a volume of sound outputting from the audio output unit 152 or switching to a touch recognizing mode of the display module 151 can be input to the second manipulating unit 132.

Figure 2B:
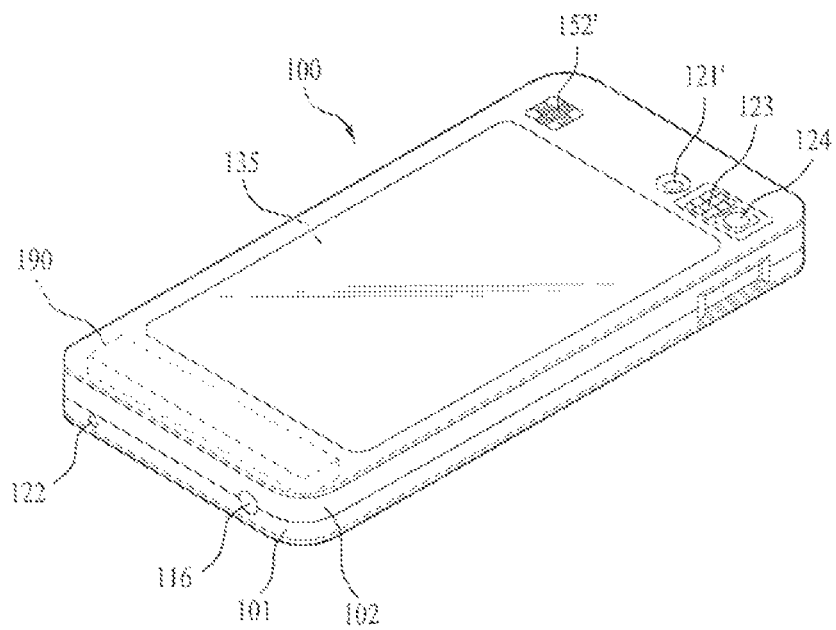
FIG. 2B is a rear perspective diagram of a mobile terminal according to one embodiment of the present invention.
Figure 3:
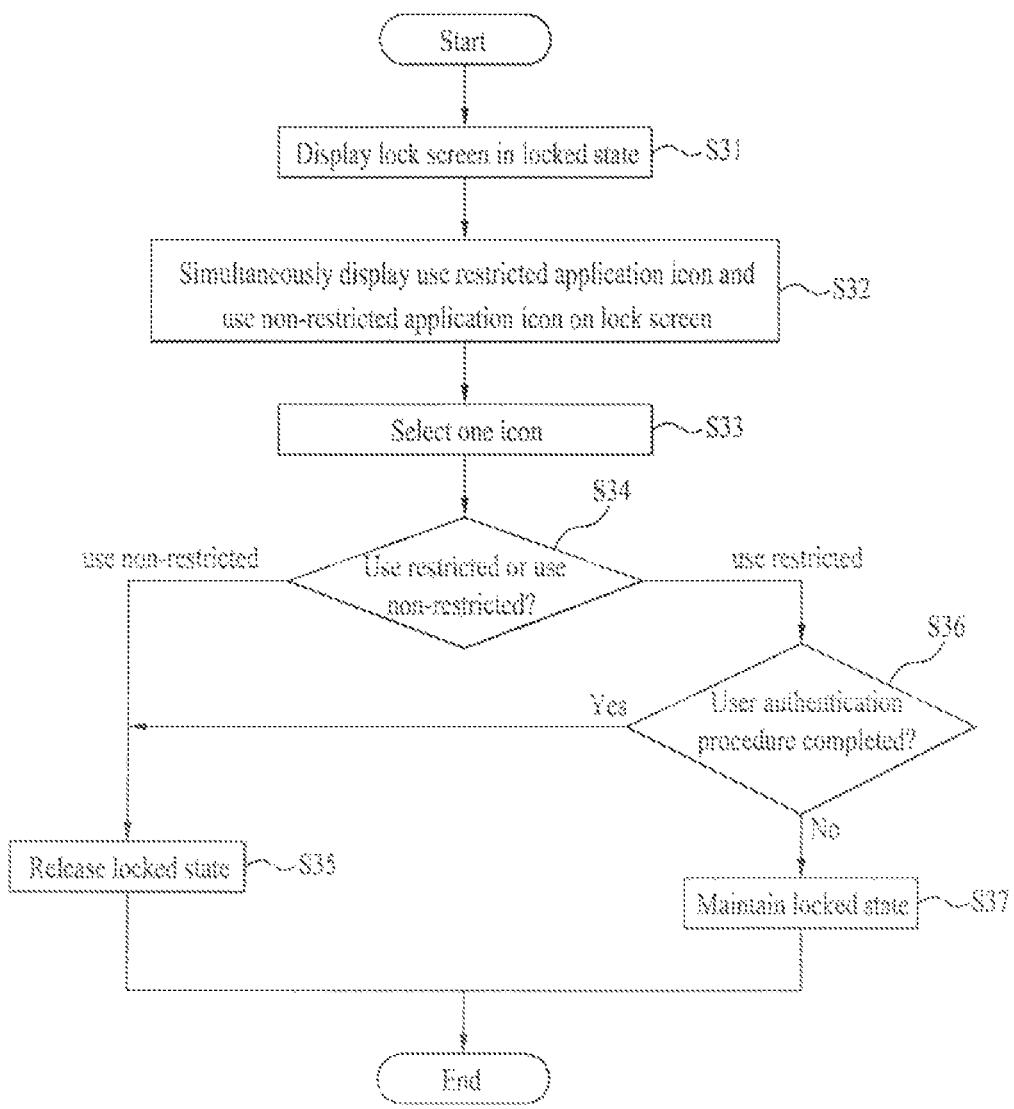
FIG. 3 is a flowchart for a method of controlling a mobile terminal according to an embodiment of the present invention.
Figure 4:
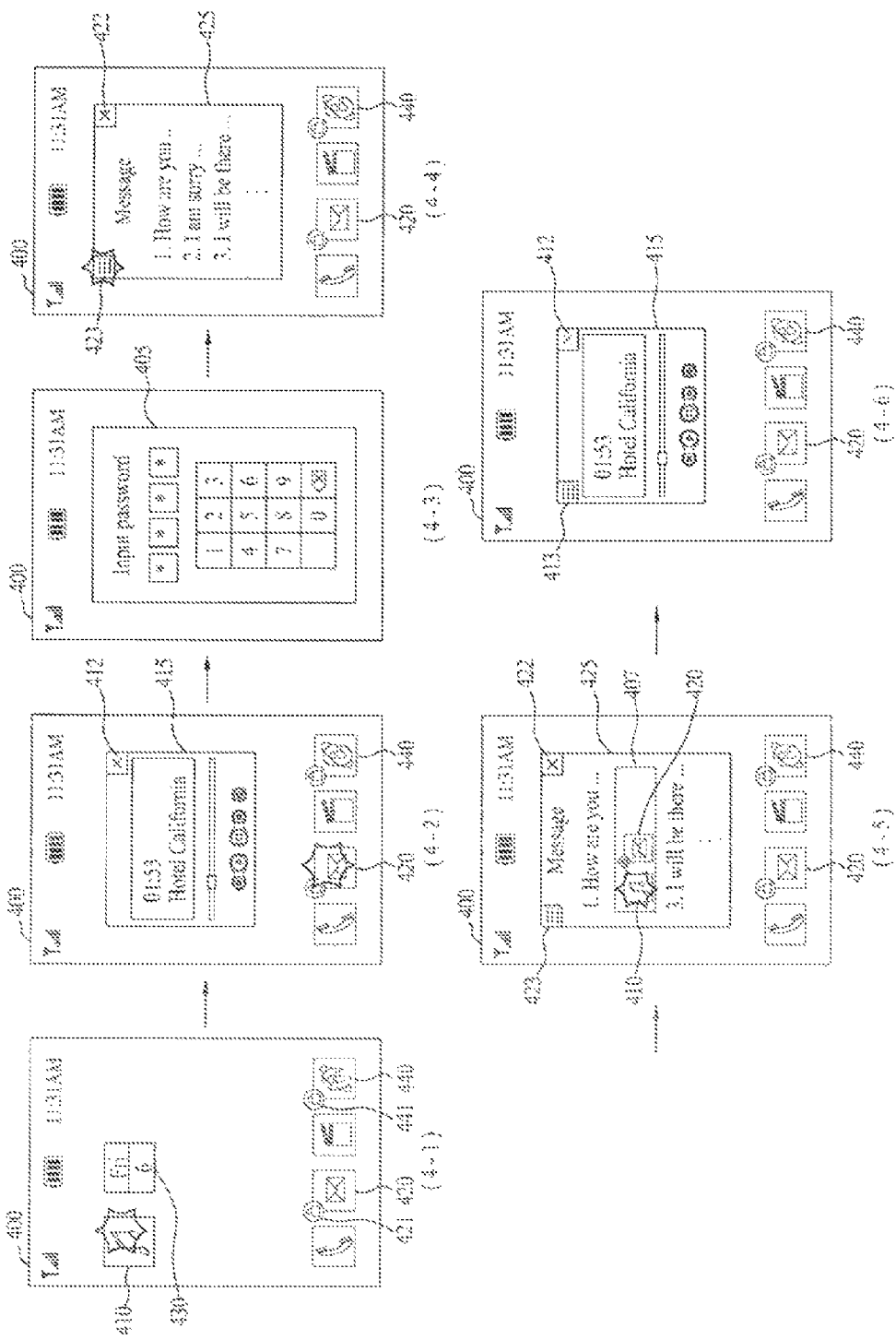
FIGS. 4 to 9 are diagrams of display screen configurations for implementing a method of controlling a mobile terminal according to an embodiment of the present invention.

FIG. 2B is a perspective diagram of a rear side of the mobile terminal 100 shown in FIG. 4 according to an embodiment of the present invention. Referring to FIG. 2B, a camera module 121' can be additionally provided to a backside of the mobile terminal 100, and more particularly, to the rear case 102. The camera module 121' has a photographing direction that is substantially opposite to that of the camera module 121 shown in FIG. 3A and may have a different number of pixels to provide a different resolution from that of the camera module 121.

Typically, the camera module 121 can have enough resolution to capture and transmit a picture of a user's face for a video call, while the camera module 121' has a higher resolution for capturing a general subject for photography without transmitting the captured subject. Each of the camera modules 121 and 121' can be installed in the mobile terminal 100 to be rotated open or popped open.

The flash module 123 and the mirror module 124 are additionally provided adjacent to the camera module 121'. The flash module 123 projects light toward a subject in case of photographing the subject using the camera module 121'. In case that a user attempts to take a picture of the user (e.g., self-photography) using the camera module 121', the mirror module 124 enables the user to view user's face reflected by the mirror module 124.

An additional audio output unit 152' can be provided to the backside of the mobile terminal 100. The additional audio output unit 152' can implement a stereo function together with the audio output unit 152 shown in FIG. 3A and may be used to implement a speakerphone mode when the mobile terminal 100 is configured in the phone call mode.

The broadcast signal antenna 116 can be provided to the lateral side of the mobile terminal 100 to provide further communication capabilities to the mobile terminal 100. The broadcast signal antenna 116 can be constructed as a portion of the broadcast receiving module 111 shown in FIG. 1. Additionally, the broadcast signal antenna 116 can be configured to be retractable in the mobile terminal 100.

The power supply unit 190 for supplying power to the mobile terminal 100 can be configured to be built within the mobile terminal 100. Alternatively, the power supply unit 190 can be configured to be detachably connected to the mobile terminal 100.

A touchpad 135 for detecting a touch can be additionally provided to the rear case 102. The touchpad 135 can be configured in a light transmittive type like the display module 151. In this case, if the display module 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display module 151 of the front case 101. The touchpad 135 can be provided in rear of the display module 151 in parallel. The touchpad 135 can have a size equal to or smaller than that of the display module 151.

FIG. 3 is a flowchart for a method of controlling a mobile terminal according to an embodiment of the present invention. Referring to FIG. 3, if the mobile terminal 100 enters a locked state when performing a multitasking procedure by executing both a music play menu and a message menu. For example, the controller 180 can control a lock screen to be displayed on the display module 151 [S31].

Icons of the executed menus can be displayed on the lock screen in the order of the corresponding menu being executed. The icons can coexist in the lock screen irrespective of whether the use of the corresponding menu is restricted or non-restricted [S32].

If either the music play menu icon or the message menu icon is selected [S33], the controller 180 determines whether the selected icon is a restricted use icon or a non-restricted use icon [S34]. In other words, the controller 180 determines whether a password would be required to access the selected menu icon.

If the music play menu icon is designated as a non-restricted use icon, the controller 180 can control the locked state to be directly released without performing a user authentication procedure. Accordingly, the controller 180 releases the locked state [S35]. Alternatively, if the music play menu icon is designated as a restricted use icon, the user authentication procedure would be performed.

Once the user enters a password via the user authentication procedure, the controller 180 determines whether the entered password is correct [S36]. In some embodiments, the password may be preset and stored in the mobile terminal 100. Accordingly, a password can be entered to determine whether it matches the preset password and, therefore, complete the user authentication procedure.

If the entered password is correct, the user authentication procedure is complete. After completing the user authentication procedure, the controller 180 can control the locked state to be released.

However, if the preset password is incorrect, the user authentication procedure is not complete. As such, the controller 180 can control the locked state not to be released [S37].

Figure 5:
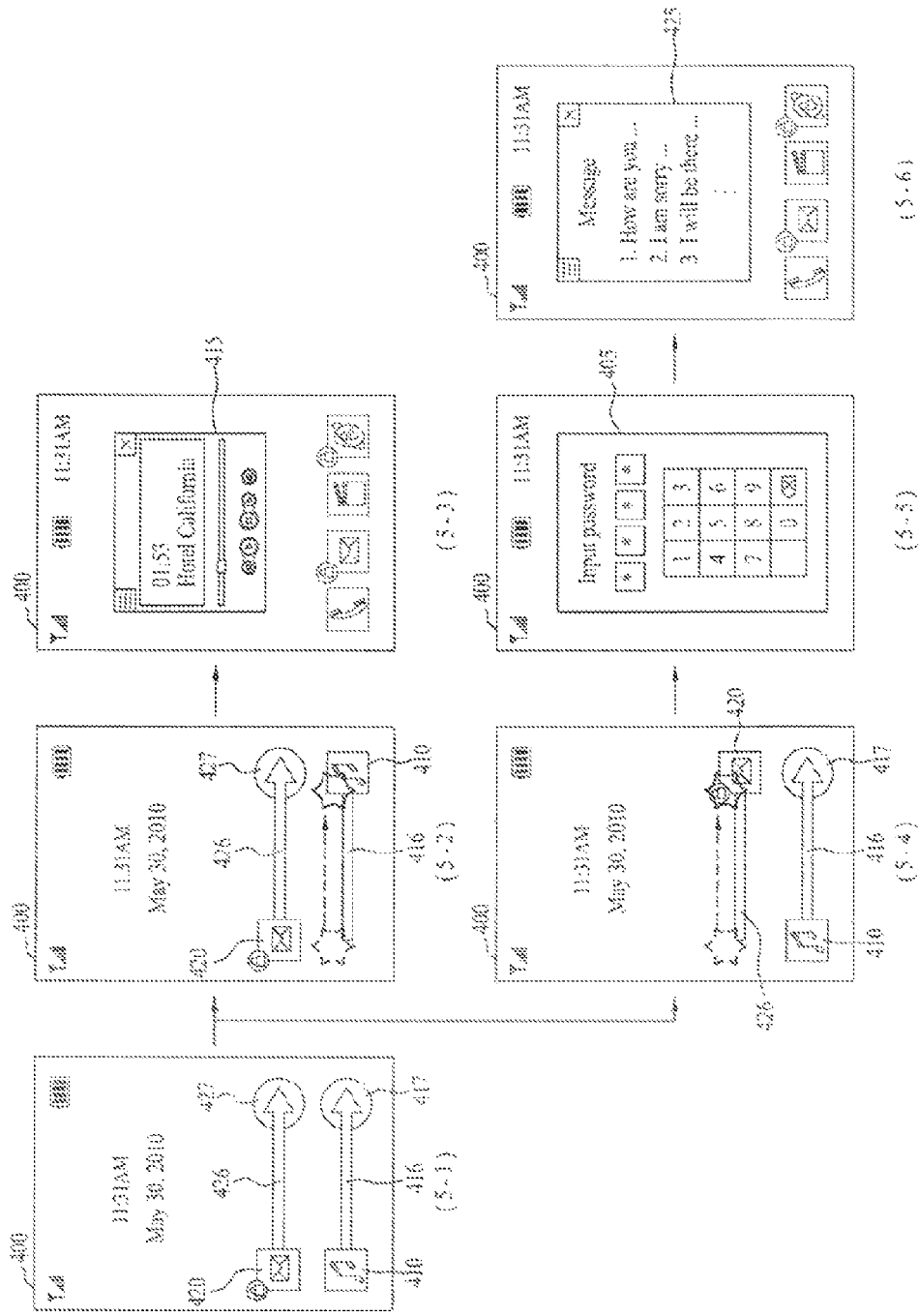

FIG. 4 and FIG. 5 are diagrams of display screen configurations for implementing a method of controlling a mobile terminal according to an embodiment of the present invention.

For purposes of explanation, it is assumed that the mobile terminal 100 is in a standby mode. Referring to FIG. 4 (4-1), the controller 180 of the mobile terminal 100 can control a standby image to be displayed on a touchscreen 400.

A plurality of menus or applications can be executed in the mobile terminal 100 and at least one or more menu icons corresponding to a plurality of the menus can be displayed on the standby image. Various menu icons including a music play menu icon 410, a message menu icon 420, a calendar menu icon 430 and an Internet browser menu icon 440 can be displayed on the standby image.

In this disclosure, 'menu', 'application' and 'function' of the mobile terminal can be regarded as being equivalent to each other in a sense of executing a corresponding function. Therefore, in the following description, each of the terms 'menu', 'application' and 'function' can indicate the same meaning in use.

A setting to restrict use of the mobile terminal 100 can be performed individually on each of the menus executable by the mobile terminal 100. As such, a corresponding menu can only be executed if a prescribed user authentication procedure is performed. The prescribed user authentication restricts non-authorized users in using the corresponding menu except an authorized user in order to protect the authorized user's privacy or prevent unauthorized use of the mobile terminal 100.

It would be apparent to those skilled in the art that the terminal user can set a user restriction for each individual menu through an appropriate manipulation of the user input unit 130 of the mobile terminal 100. For clarity, the corresponding details shall be omitted from the following description.

In one embodiment, it is assumed that a setting for restricting use can be set individually for each menu. Therefore, restriction indicators 421 and 441 can be displayed relative to the message menu icon 420 and the Internet browser menu icon 440, respectively, to inform the terminal user that the corresponding menu is restricted.

When a prescribed user authentication procedure is performed, a menu for setting the user restrictions can be executed in the mobile terminal 100.

In one example, the music play menu icon 410 can be touched and selected from the touchscreen 400. Since the music play menu is not restricted, the controller can control a music play menu to be executed in the mobile terminal 100 without performing a user authentication procedure.

Referring to FIG. 4 (4-2), the controller 180 can display on the touchscreen 400 a music play window 415 in response to the music play menu icon 410 being selected. A close icon 412 for closing the music play window 415 can be included in the music play window 415.

While the music play menu is being executed, the message menu icon 420 can be touched and selected from the touchscreen 400.

Referring to FIG. 4 (4-3), the controller 180 can control a user authentication window 405 for the user authentication procedure to be displayed since the message menu is restricted. As such, a user authentication procedure can be performed. The controller 180 displays on the touchscreen 400 a user authentication window 405. The user authentication window 405 can be presented in various ways for receiving user authentication information.

If the terminal user inputs a preset password (e.g., user authentication information) via the user authentication window 405, the user authentication procedure can be performed.

If so, the controller 180 can execute the message menu while executing the music play menu. In particular, the multitasking of the music play menu and the message menu can be performed in the mobile terminal 100.

Referring to FIG. 4 (4-4), although the multitasking is performed on both of the music play menu and the message menu, the controller 180 can control a message window 425 to be displayed on the touchscreen 400.

As the multitasking of the music play menu and the message menu is performed, the controller 180 can control a multitasking icon 423 to be displayed on the message window 425.

Referring to FIG. 4 (4-5), the controller 180 can control a multitasking list 407 for listing currently executed menus to be displayed on the touchscreen 400 if the multitasking icon 423 is selected. In this case, icons of the executed menus in multitasking, e.g., the music play menu icon 410 and the message menu icon 420 can be displayed on the multitasking list 407.

Subsequently, the music play menu icon 410 can be touched and selected from the multitasking list 407 to switch from the message window 425 to the music play window 415.

If so, the controller 180 keeps performing the multitasking on the music play menu and the message menu and is also able to control the music play window 415 to be displayed on the touchscreen 400.

As the multitasking of the music play menu and the message menu is performed, the controller 180 can control the multitasking icon 413 to be displayed on the music play window 415 as well.

In this case, the 'locked state' means a state that a partially restricted touch gesture can be recognized only while partially restricted information is just displayed on the touchscreen 400 for the prevention of malfunction (or incorrect manipulation) and the protection of terminal user's privacy.

If a user input is not performed on the mobile terminal 100 during a preset period of time or a preset user command is input via the user input unit 130, the controller 180 can control the mobile terminal 100 to enter the locked state.

In another embodiment, the icons of the menus can coexist while executing a multitasking operation, that is, the music play menu icon 410 and the message menu icon 420 can be simultaneously displayed on the lock screen via the touchscreen 400.

Referring to FIG. 5 (5-1), the music play menu icon 410 can be displayed together with a corresponding path 416 and a corresponding destination 417. Additionally, the message menu icon 420 can be displayed together with a corresponding path 426 and a corresponding destination 427.

Since the music play menu icon 410 does not have a restriction indicator displayed nearby, the music play menu icon 410 is one of the non-restricted menus on the lock screen. In contrast, as a restriction indicator is displayed on the message menu icon 420, the message menu icon 420 is one of the restricted menus on the lock screen.

When the mobile terminal 100 is in the locked state, the controller 180 can control where on the touchscreen 400 a touch gesture could be recognized or detected. For example, a touch gesture performed on each of the music play menu icon 410 and the message menu icon 420 can be detected to release the locked state.

Referring to FIG. 5 (5-2), in order to select the music play menu icon 410 in the lock screen displayed on the touchscreen 400, a touch gesture can be performed by touching and dragging the music play menu icon 410 along the corresponding path 416 to the corresponding destination 417.

Referring to FIG. 5 (5-3), the controller 180 can control the lock screen to be removed from the touchscreen 400 and instead display the music play window 415 when the locked state is released.

Meanwhile, the message menu icon 420 can be selected to release the locked state in a following manner. Referring to FIG. 5 (5-4), in order to select the message menu icon 420 in the lock screen displayed on the touchscreen 400, a touch gesture can be performed by touching and dragging the message menu icon 420 along the corresponding path 426 to the corresponding destination 427.

Since the message menu icon 420 is a restricted menu, the controller 180 can control the user authentication window 405 to be displayed to execute the user authentication procedure. Upon detecting the touched and dragged message menu icon 420 on the corresponding destination 427, the user authentication procedure can be performed. Accordingly, a password can be entered via the user authentication window 405.

Referring to FIG. 5 (5-6), the controller 180 can control the lock screen to disappear from the touchscreen 400 and instead display the message window 425 when the locked state is released using the message menu icon 420.

Furthermore, when the mobile terminal enters the locked state, menu icons being displayed on the lock screen during a multitasking operation are non-limiting. For example, menu icons previously set as "favorite" menus by a terminal user can be displayed on the lock screen. If one of the favorite menu icons is selected, the locked sate can be released. Accordingly, the corresponding menu of the selected favorite menu icon can be displayed on the touchscreen 400 instead of the lock screen.

Figure 6:
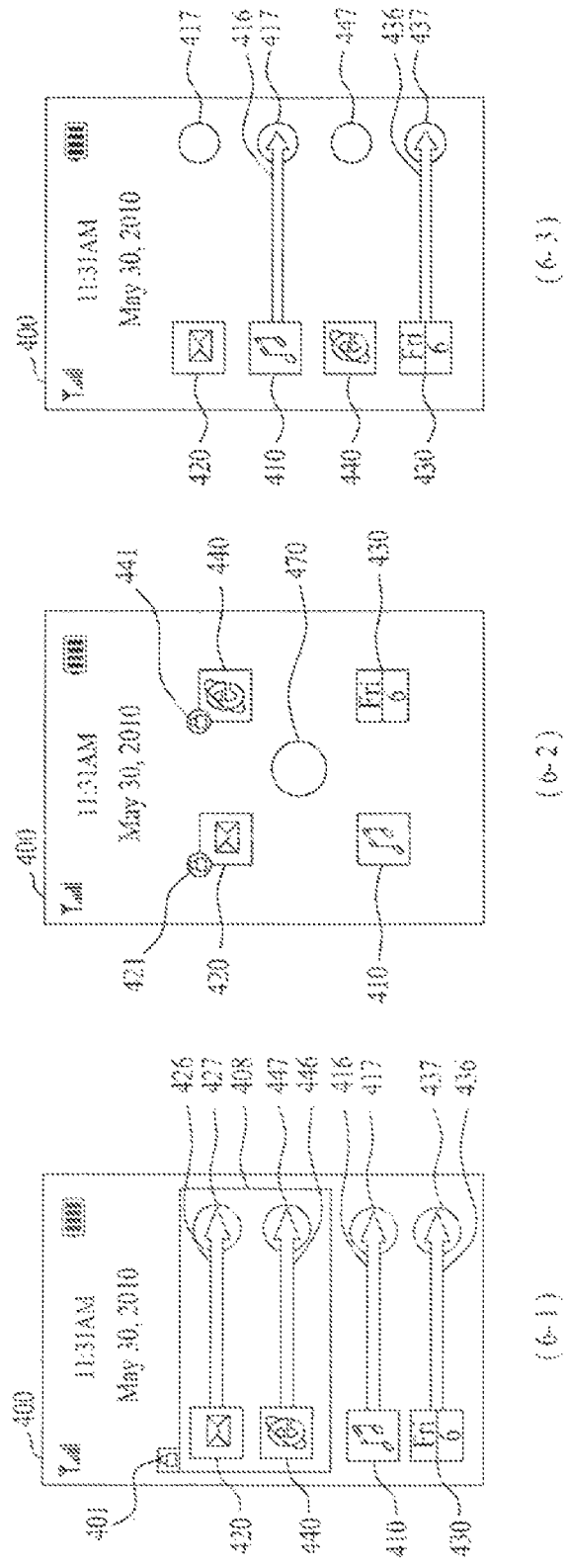

FIG. 6 is a diagram of display screen configurations for implementing a method of controlling the mobile terminal 100 according to an embodiment of the present invention. For example, various types of lock screens can be displayed on the touchscreen 400 of the mobile terminal 100.

In a first embodiment, restricted use icons and non-restricted use icons can coexist on different portions of the lock screen. Referring to FIG. 6 (6-1), a restricted use menu region 408 for restricted use icons can be allocated on the lock screen. In particular, the restricted use icons 420 and 440 can be displayed separately from the non-restricted use icons 410 and 430 such that the restricted use menus can be displayed in the restricted use menu region 408. The non-restricted use icons 410 and 430 can be displayed outside the restricted use menu region 408.

As mentioned in the foregoing description, the mobile terminal 100 can be released from the locked state using an icon being displayed on the lock screen.

In some embodiments, a common portion of the touchscreen 400 can be used to execute each of the menu icons displayed on the lock screen. Referring to FIG. 6 (6-2), the menu icons displayed on the lock screen can be configured to have a common destination 470. Moreover, a corresponding path of the menu icon can be omitted from being displayed on the lock screen. As such, each of the menu icons displayed on the lock screen can be touched and dragged to the common destination 470 for execution regardless of the type of restriction corresponding to the menu icon.

In another embodiment, corresponding paths can be displayed depending on the type of restriction of the menu icon. Referring to FIG. 6 (6-3), corresponding paths 416 and 436 of the non-restricted use icons 410 and 430 can be displayed on the lock screen. In contrast, the restricted use icons 420 and 440 can be displayed on the lock screen without corresponding paths for execution.

Figure 7:
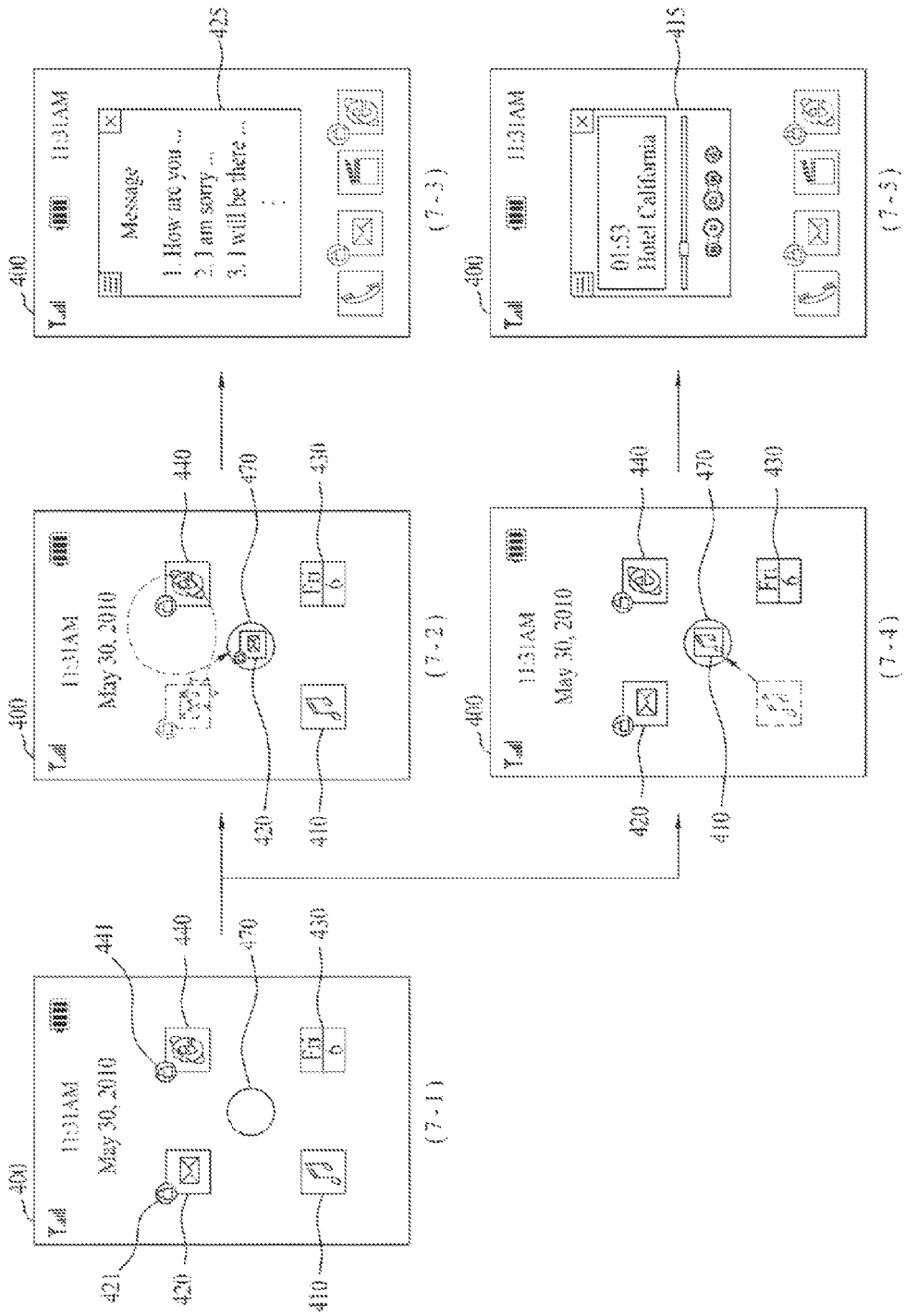
Figure 8:
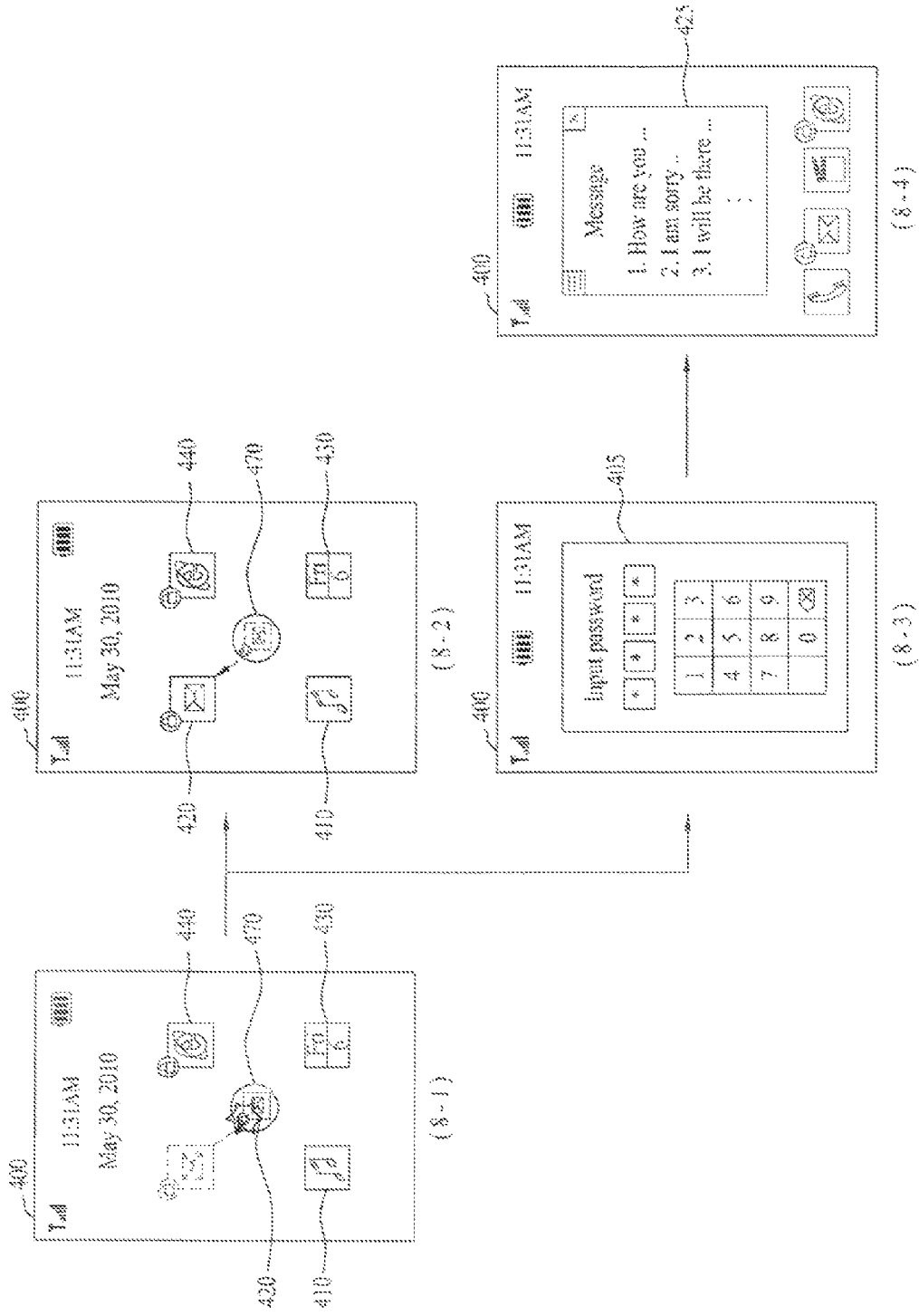

In the following description, a process for releasing the mobile terminal from the locked state using the restricted use icon on the lock screen shown in FIG. 6 (6-2) is explained with reference to FIGS. 7 and 8. FIG. 7 and FIG. 8 are diagrams of display screen configurations for implementing a method of controlling a mobile terminal according to an embodiment of the present invention.

Referring to FIG. 7 (7-1), the restricted use icons 420 and 440, the non-restricted use icons 410 and 430, and the common destination 470 can be displayed on the lock screen of the touchscreen 400.

In one embodiment, selecting a restricted use icon using a predetermined motion on the touchscreen 400 can release the mobile terminal 100 from the locked state. Referring to FIG. 7 (7-2), the message menu icon 420, noted as a restricted use icon via the restricted indicator 421, can be touched and dragged to the common destination 470, for example. When the message menu icon 420 is touched and dragged to the common destination 470, the corresponding touch and drag can be performed along a predetermined pattern or trace as a form of completing the user authentication procedure. In other words, the process of releasing the mobile terminal 100 from the locked state by selecting the message menu icon 420 can be reduced to a single touch gesture (e.g., a single touch stroke) performed on the touchscreen 400. The combination of a touch and drag input in a predetermined path on the touchscreen 400 and the user authentication procedure to be executed simultaneously with respect to the touch and drag input allows the locked state release to be more efficient and convenient to a user.

When the setting for restricting use is performed on corresponding restricted use icons, it is apparent to those skilled in the art that a terminal user can set a corresponding pattern in advance.

FIG. 7 (7-2) exemplarily shows that a predetermined touch pattern to execute a user authentication procedure is performed such that the touch pattern includes a circle-shaped rotation in a counterclockwise direction on the touchscreen 400.

Subsequently, the controller 180 determines whether the message menu icon 420 has been touched and dragged to the common destination 470 and also determines whether the message menu icon 420 has been correctly touched and dragged along the predetermined touch pattern.

Referring to FIG. 7 (7-3), the controller 180 can control the locked state to be released if there no error in performing the predetermined touch pattern is detected. As mentioned in the foregoing description, since the locked state is released using the message menu icon 420, the controller 180 can control the message window 425 to be displayed on the touchscreen 400 by removing the lock screen from the touchscreen 400.

Meanwhile, referring to FIG. 7 (7-4), the music play menu icon 410 can be touched and dragged to the common destination 470. Since the music play menu icon 410 is a non-restricted use icon, the music play menu icon 410 can be merely dragged from its original position to the common destination 470 since no user authentication procedure is to be performed. That is, a non-restricted use icon does not need to follow a predetermined pattern on the touchscreen 400.

The controller 180 determines whether the music play menu icon 410 has been touched and dragged to the common destination 470. If there is no problem as a result of the determination, referring to FIG. 7 (7-5), the controller 180 can control the locked state to be released. As mentioned in the foregoing description, since the locked state is released using the music play menu icon 410, the controller 180 can control the music play window 415 to be displayed on the touchscreen 400 by removing the lock screen from the touchscreen 400.

Unless both of the selected message menu icon 420 and the selected music play menu icon 410 are touched and dragged to the common destination 470, the controller 180 can control the locked state not to be released.

Although the message menu icon 420 of the restricted use icon can be touched and dragged to the common destination 470 in a predetermined path on the touchscreen 400, the lock screen may be removed in response to a non-predetermined pattern or trace.

Referring to FIG. 8 (8-1), the message menu icon 420 as a restricted use icon is touched and dragged to the common destination 470 on the lock screen of the touchscreen 400 without following a predetermined touch trace or pattern.

If so, referring to FIG. 8 (8-2), the controller 180 can control the locked state not to be released in the mobile terminal 100 by having the touched and dragged message menu icon 420 return to its original position.

Alternatively, referring to FIG. 8 (8-3), when the touch and drag does not follow the predetermined touch trace, the controller 180 can control the user authentication window 405 to be displayed on the touchscreen 400 for the user authentication procedure to be performed. In particular, if a terminal user inputs a preset password via the user authentication window 405, the controller 180 can control the user authentication procedure to proceed.

Referring to FIG. 8 (8-4), if the password input via the user authentication window 405 matches the preset password, the controller 180 can control the locked state to be released.

Figure 9:
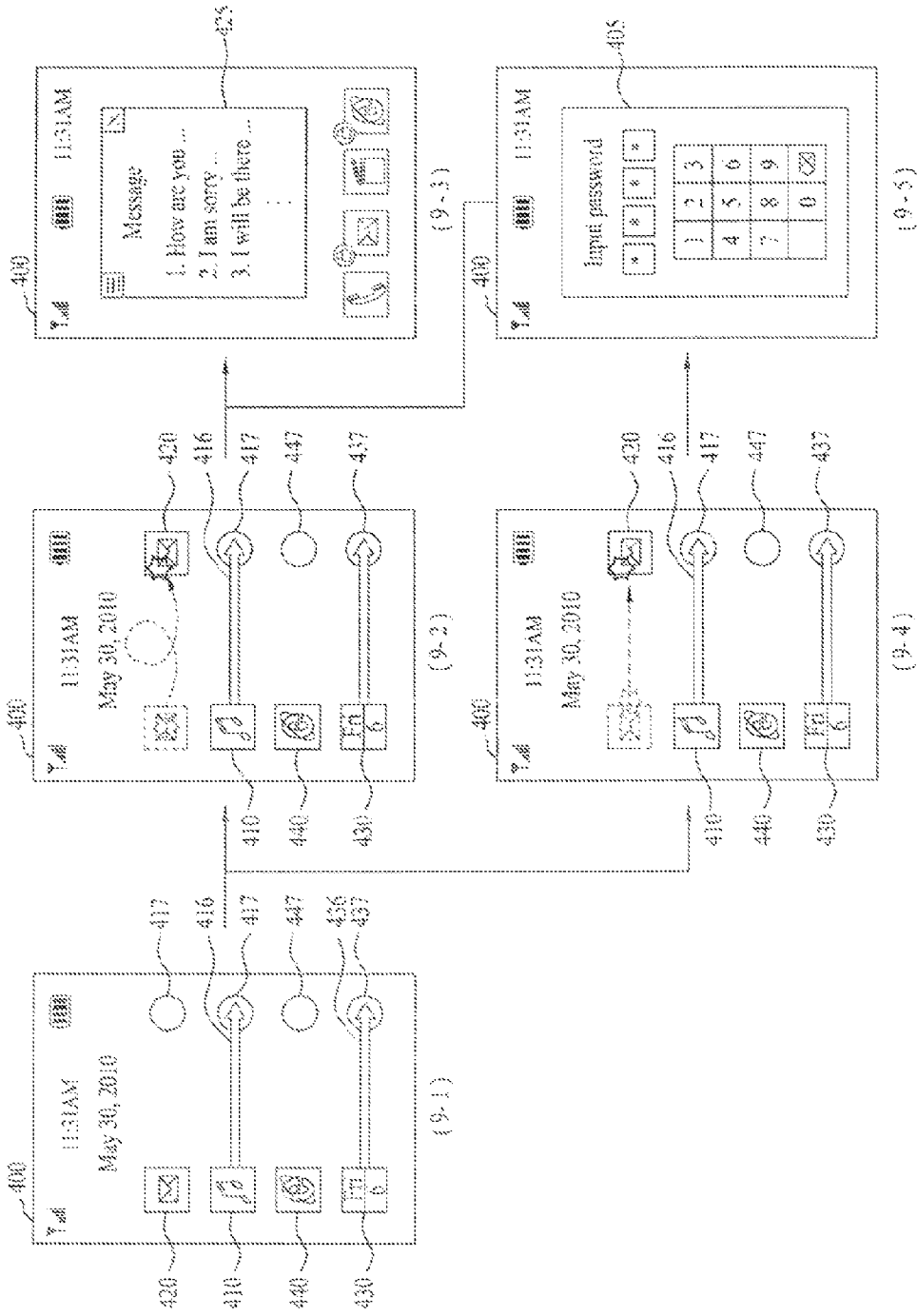

In the following description, a process for releasing the mobile terminal from the locked state using the restricted use icon on the lock screen shown in FIG. 6 (6-3) is explained with reference to FIG. 9. FIG. 9 is a diagram of display screen configurations for implementing a method of controlling a mobile terminal according to an embodiment of the present invention.

Referring to FIG. 9 (9-1), the restricted use icons 420 and 440 and the non-restricted use icons 410 and 430 are displayed on the lock screen of the touchscreen 400. Moreover, the corresponding destinations 417, 427, 437 and 447 can be displayed on the lock screen to correspond to the displayed icons 410, 420, 430 and 440, respectively. Furthermore, touch paths 416 and 436 can be displayed on the lock screen of the touchscreen 400 to correspond to the non-restricted use icons 410 and 430, respectively.

Referring to FIG. 9 (9-2), the message menu icon 420 as a restricted use icon is selected then touched and dragged to the corresponding destination 427. The touch and drag operation can be performed along a predetermined touch pattern or trace for performing a user authentication procedure. The combination of a touch and drag input in a predetermined path on the touchscreen 400 being performed simultaneously with the user authentication procedure can be reduced to a single touch gesture (e.g., a single touch stroke).

FIG. 9 (9-2) exemplarily shows that the touch pattern on the touchscreen 400 for the user authentication procedure can be a circular rotation in a counterclockwise direction, for example.

Subsequently, the controller 180 determines whether the message menu icon 420 has been touched and dragged to the corresponding destination 427 and also determines whether the message menu icon 420 has been touched and dragged along the predetermined touch pattern.

Referring to FIG. 9 (9-3), if no problem is detected, the controller 180 can control the locked state to be released. In another embodiment, the locked state can be released via the message menu icon 420 without following a predetermined pattern or trace by executing the user authentication procedure via the user authentication window 405.

For example, the message menu icon 420 as the restricted use icon can be touched and dragged to the corresponding destination 427 on the lock screen of the touchscreen 400 without following a preset touch trace (FIG. 9 (9-4)).

Referring to FIG. 9 (9-5), the controller 180 can control the user authentication window 405 to be displayed as an additional user authentication procedure on the touchscreen 400 upon detecting the preset touch trace. Alternatively, the terminal user may enter the user authentication procedure via the user authentication window 405 upon a touch and drag input without a preset touch trace being detected.

If a terminal user inputs a preset password via the user authentication window 405, the controller 180 can control the user authentication procedure to proceed. If the preset password is input to the user authentication window 405, the controller 180 can control the locked state to be released (FIG. 9 (9-3)).

In one embodiment, when the restricted use icon 420 is touched and dragged to the corresponding destination along the preset touch trace on the lock screen, the mobile terminal is released from the locked state. In another embodiment, the corresponding destination for the restricted use icon may not exist on the touchscreen 400. In particular, if the restricted use icon is touched and dragged on the lock screen along the preset touch trace, it can configure the mobile terminal to be released from the locked state regardless of the restricted use icon not arriving at any particular destination icon or portion of the touchscreen 400. As mentioned in the foregoing description, when the mobile terminal is released from the locked state, the locked screen is removed from the touchscreen 400 and an image about the corresponding menu of the touched and dragged restricted use icon can be displayed.

Meanwhile, a soft keypad for inputting a prescribed password can be provided simultaneously with the user authentication window 405 described with reference to FIG. 4 (4-3). Yet, the soft keypad is optionally provided to the user authentication window 405. In the following description, the user authentication window without the soft keypad for the password input is explained with reference to FIG. 10.

Figure 10:
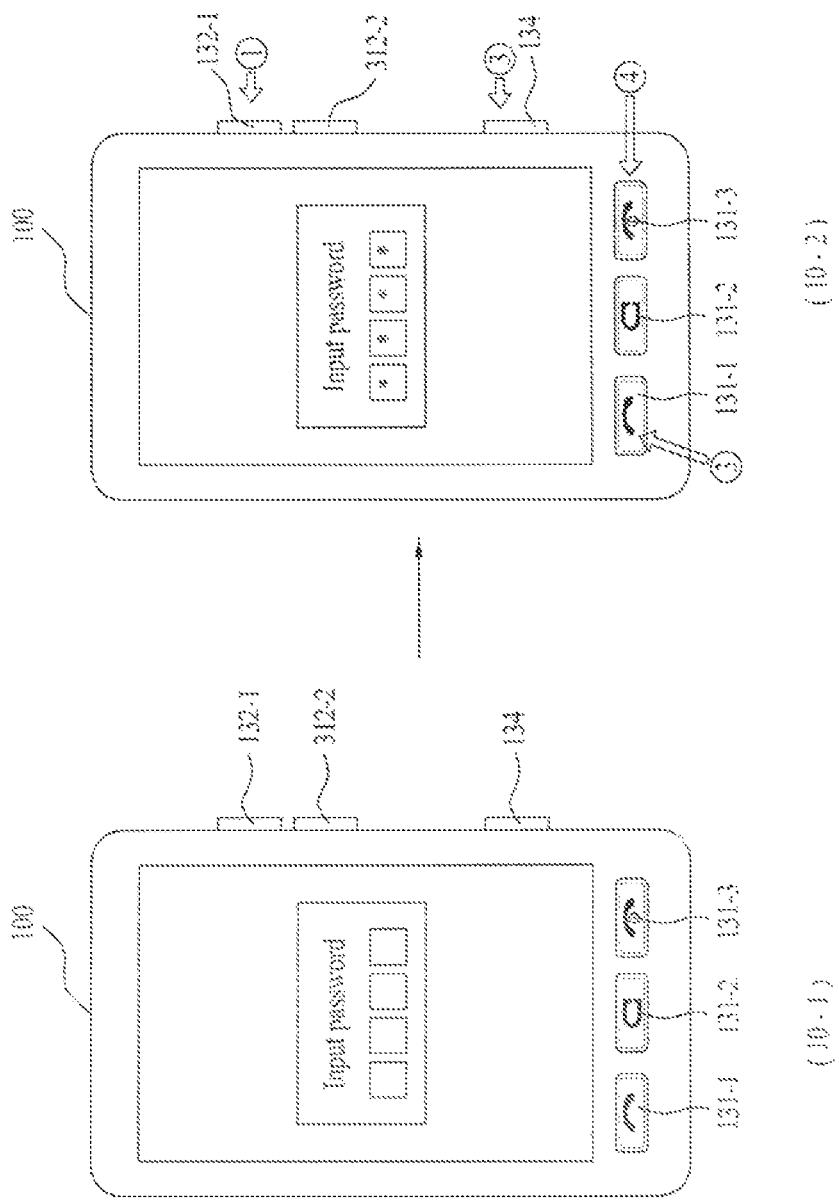
FIG. 10 is a diagram of a front side of a mobile terminal according to an embodiment of the present invention.

FIG. 10 is a diagram of a front side of a mobile terminal according to an embodiment of the present invention. Referring to FIG. 10 (10-1), a soft keypad for a password input may not be displayed on the user authentication window 405 for the user authentication procedure.

In lieu of the soft keypad, hardware key buttons 131-1 to 131-3, 132-1, 132-3 (also referred to herein as "hardware key buttons") and 134 provided to the housing of the mobile terminal 100 can be used for the password input. In this case, the hardware key buttons may be separate from a keypad provided to the mobile terminal 100. In particular, if the user authentication window 405 is not displayed on the touchscreen 400, the hardware key buttons can each operate for unique functions. If the user authentication window 405 is displayed on the touchscreen 400, the hardware key buttons can be used for the password input.

Referring to FIG. 10 (10-2), when the user authentication window 405 is displayed on the touchscreen 400, the hardware key buttons can be pressed entirely or in part in preset order. In particular, the partial or entire manipulation of the hardware key buttons according to the preset order can correspond to the input of the preset password for the user authentication procedure. FIG. 10 (10-2) exemplarily shows that the hardware key buttons are sequentially pressed in order to input the preset password. When the hardware key buttons are sequentially pressed, one of the hardware key buttons can be repeatedly pressed at least twice. In particular, the hardware key buttons can be understood as one of various user authentication information input means that can be implemented in the mobile terminal 100.

In one embodiment, while the mobile terminal is in the locked state, the restricted use icons can be continually displayed on the lock screen. In another embodiment, while the mobile terminal is in the locked state, the restricted use icons may not be displayed continually on the lock screen. This is further explained with reference to FIGS. 11 to 13 as follows.

Figure 11:
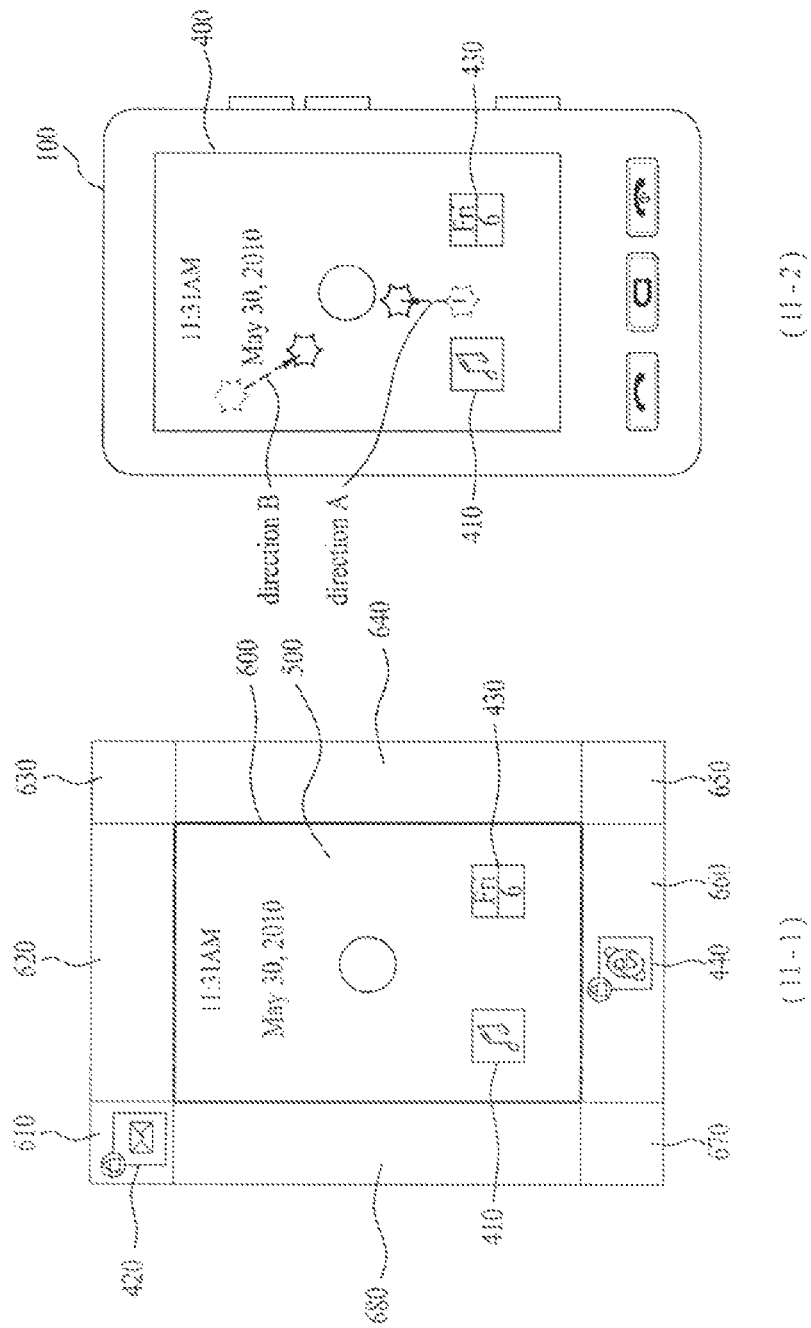
FIGS. 11 to 13 are diagrams of a front side of a mobile terminal according to an embodiment of the present invention, in which a virtual lock screen domain for the mobile terminal is shown.
Figure 12:
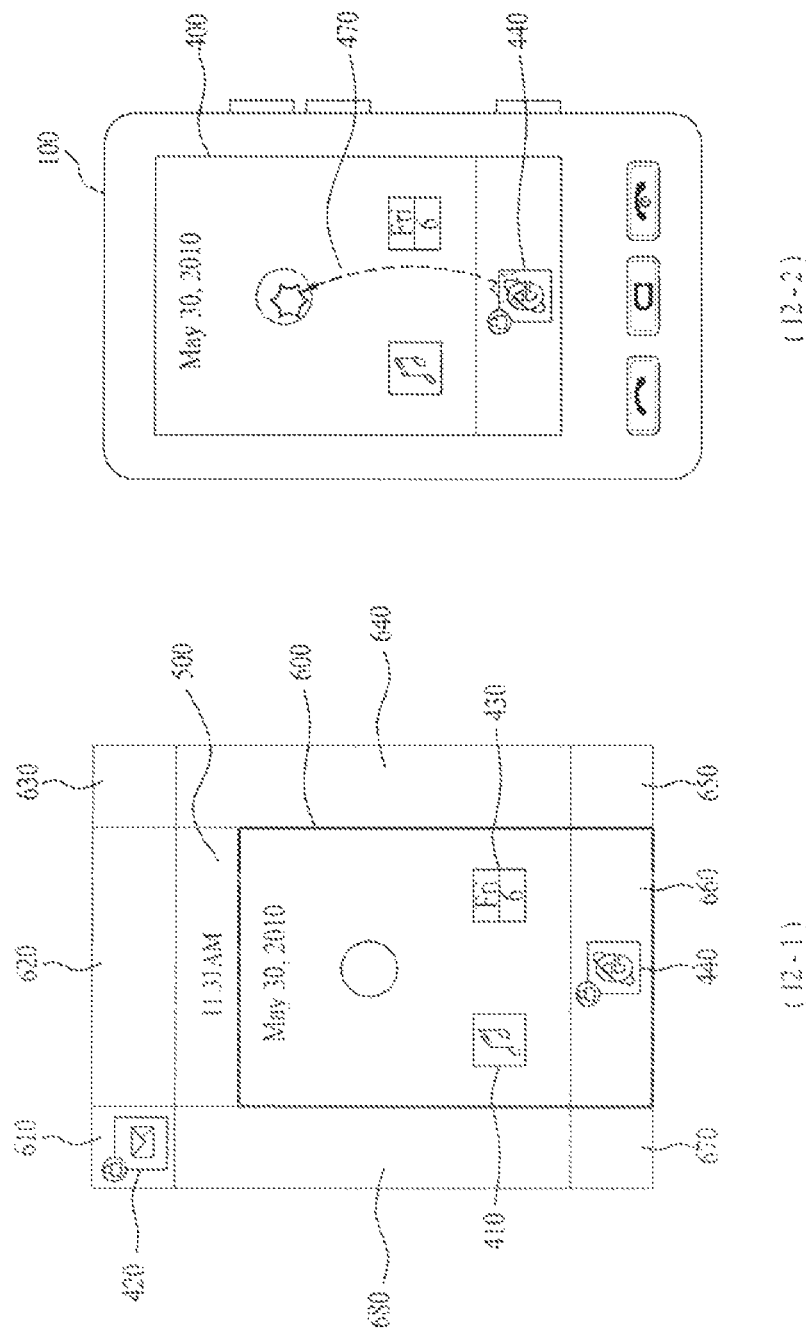
Figure 13:
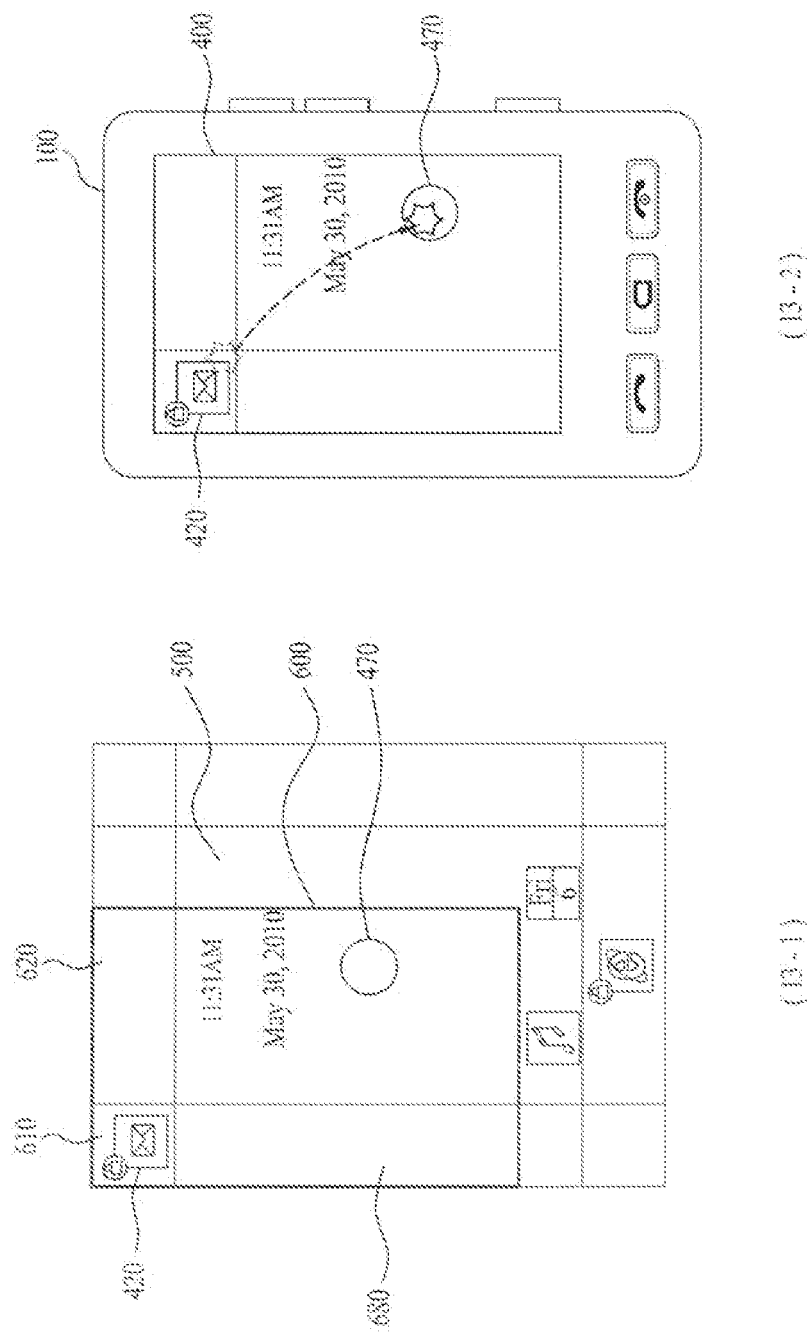

FIGS. 11 to 13 are diagrams of a front side of a mobile terminal according to an embodiment of the present invention, in which a virtual lock screen domain for the mobile terminal is shown.

Referring to FIG. 11 (11-1), the virtual lock screen domain can include a main display region 500 and at least one subdisplay regions 610 to 680. FIG. 11 (11-1) exemplarily shows that the subdisplay regions can be arranged around the main display region 500.

Referring to FIG. 11 (11-2), the main display region 500 is the region basically displayed on the touchscreen 400 when the mobile terminal 100 enters the locked state. The non-restricted use icons 410 and 430 can exist in the main display region 500 (FIG. 11 (11-1)). The region displayed on the touchscreen 400 (FIG. 11 (11-2)) is represented as a display frame 600 (FIG. 11 (11-1)).

After the main display region 500 has been displayed on the touchscreen 400, the subdisplay regions 610 to 680 are the regions that can be displayed when a touch and drag is performed on the touchscreen 400 in a prescribed direction. A subdisplay region corresponding to the touch and drag direction among the subdisplay regions 610 to 680 can be displayed. The subdisplay regions 610 to 680 can be hidden instead of being displayed until the touch and drag is performed on the touchscreen 400. Accordingly, the subdisplay regions 610 to 680 can be understood as hidden regions (or hidden areas) of the touchscreen 400.

When the mobile terminal 100 is in the locked state and the main display region 500 is displayed on the touchscreen 400, a touch and drag input can be performed in a direction "A" or a direction "B."

Referring to FIG. 12 (12-1), the display frame 600 can be shifted in the opposite of the direction "A" within a virtual lock screen domain. The shifted display frame 600 can be positioned by occupying a whole part of the subdisplay region 660 located at a bottom portion of the virtual screen domain and a portion of the main display region 500, for example.

Referring to FIG. 12 (12-2), when the mobile terminal 100 is in the locked state, the virtual lock screen domain slides to simultaneously display the bottom subdisplay region 660 and the main display region 500 corresponding to the display frame 600 having been shifted in an opposite direction of the direction "A." Therefore, the Internet browser menu icon 440 of the restricted use icon positioned within the bottom subdisplay region 660 can be displayed on the touchscreen 400.

In the following description, the touch and drag performed in the direction "B" on the touchscreen 400 is explained with reference to FIG. 13. Referring to FIG. 13, when the mobile terminal 100 is in the locked state and the main display region 500 is displayed on the touchscreen 400, the touch and drag can be performed in the direction "B" shown in FIG. 11 (11-2).

Referring to FIG. 13 (13-1), the display frame 600 can be shifted in an opposite direction of the direction "B" in the virtual lock screen domain. The shifted display frame 600 can be positioned by occupying a subdisplay region 610, a portion of the subdisplay region 680, a portion of the display region 620 and a portion of the main display region 500 in the virtual screen domain.

Referring to FIG. 13 (13-2), when the mobile terminal 100 is in the locked state, the virtual lock screen domain can be repositioned to move in a manner that the subdisplay region 610, the subdisplay region 680, the subdisplay region 620 and the main display region 500, which correspond to the display frame 600 having been shifted in the direction "B", can be displayed simultaneously. Therefore, the message menu icon 420 of the restricted use icon situated in the subdisplay region 610 can be displayed on the touchscreen 400.

A terminal user recognizes that the Internet browser menu icon 440 is positioned within the bottom subdisplay region 660 among the subdisplay regions 610 to 680, and then performs a touch and drag input on the touchscreen 400 in the direction "A" to enable the bottom subdisplay region 660 to be displayed on the touchscreen 400. The same can be said when a touch and drag input on the touchscreen 400 in the direction "B" enables at least the subdisplay region 610 to be displayed on the touchscreen 400.

This type of user action can be a form of performing the user authentication procedure. Thus, when the Internet browser menu icon 440 or message menu icon 420 is touched and dragged to the common destination 470 without following a separate touch trace, the controller 180 can control the mobile terminal 100 to be released from the locked state.

When the mobile terminal 100 is released from the locked state, as mentioned in the foregoing description, the lock screen disappears from the touchscreen 400 and an image about the corresponding menu of the touched and dragged menu icon can be displayed (not shown).

In another embodiment, the controller 180 can control the mobile terminal 100 to be released from the locked state only if a menu icon on the touchscreen 400 is touched and dragged to the common destination 470 along the preset touch trace in order to perform the user authentication procedure.

If a prescribed time passes after completion of the touch and drag in the direction "A" on the touchscreen 400, the controller 180 can control the display frame 600 to return to its original position corresponding to the main display region 500. In particular, if a prescribed time passes after the touch and drag in the direction "A" or direction "B" on the touchscreen 400, the controller 180 can control the main display region 500 to be displayed again on the touchscreen 400.

In FIG. 13, when the touch and drag is performed in a prescribed direction to display one subdisplay region on the touchscreen 400, the whole virtual lock screen domain slides to move on the touchscreen 400, by which the present embodiment is non-limited. For instance, when the touch and drag is performed in a prescribed direction to display one subdisplay region on the touchscreen 400, the corresponding subdisplay region can slidably appear on the touchscreen 400 while the main display region 500 does not move on the touchscreen 400. This is further explained with reference to FIG. 14 as follows.

FIG. 14 is a diagram of display screen configurations for implementing a method of controlling a mobile terminal according to an embodiment of the present invention.

Referring to FIG. 14 (14-1), while only the main display region 500 is displayed on the touchscreen 400, a touch and drag can be performed on the touchscreen 400 in the direction "A." If so, referring to FIG. 14 (14-2), the controller 180 can control the subdisplay region 660 to appear on the touchscreen 400 in a manner that the subdisplay region 660 slides over the main display region 500 only in response to the touch and drag input in the direction "A."

When the Internet browser menu icon 440 displayed on the subdisplay region 660 is touched and dragged to the common destination 470, as mentioned in the foregoing description, the mobile terminal 100 is released from the locked state.

In another embodiment, referring to FIG. 14 (14-3), a touch and drag input can be performed on the touchscreen 400 in the direction "B," when only the main display region 500 is displayed on the touchscreen 400.

Referring to FIG. 14 (14-4), the controller 180 can control the subdisplay region 610 to appear on the touchscreen 400 in a manner that the subdisplay region 610 slides over the main display region 500 only in response to the touch and drag input in the direction "B."

When the message menu icon 420 displayed on the subdisplay region 610 is touched and dragged to the common destination 470, as mentioned in the foregoing description, the mobile terminal 100 is released from the locked state.

The present disclosure provides the following effects and/or advantages. First, a mobile terminal in a locked state can be unlocked while considering a convenience to a user. In particular, a user manipulation for a mobile terminal unlocking procedure and a user manipulation for a user authentication procedure are systemized together and can be then performed in the mobile terminal. Therefore, the present disclosure facilitates the lock release.

Second, the present disclosure provides various lock release scenarios for a mobile terminal, whereby the lock release scenario appropriately selected for a terminal user from the various lock release scenarios can be applied to the mobile terminal.

It will be apparent to those skilled in the art that various modifications and variations can be specified into other forms without departing from the spirit or scope of the present disclosure.

In addition, the above-described methods can be implemented in a program recorded medium as a computer-readable media. The computer-readable media include all kinds of recording devices in which data readable by a computer system are stored. The computer-readable media can include ROM, RAM, CD-ROM, magnetic tapes, floppy discs, optical data storage devices, programmable code or carrier-wave type implementations (e.g., transmission via Internet). Furthermore, the computer can include the controller 180 of the mobile terminal.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method of controlling a mobile terminal, the method comprising:
   displaying a restricted user graphic and a non-restricted user graphic together on a lock screen;
   performing a user authentication procedure responsive to user touch-dragging of the restricted user graphic on the lock screen;
   unlocking the mobile terminal responsive to completion of the user authentication procedure; and
   switching the lock screen directly to a first execution image of a first function associated with the non-restricted user graphic without performing the user authentication procedure, the switching responsive to user touch-dragging of the non-restricted user graphic on the lock screen.

2. The method of claim 1, wherein:
   the lock screen is displayed to indicate the mobile terminal is in a locked state, and
   the restricted user graphic is displayed differently from the non-restricted user graphic.

3. The method of claim 1, wherein performing the user authentication procedure comprises:
   comparing a user input with a predetermined input; and
   authenticating a user when the user input matches the predetermined input.

4. The method of claim 3, further comprising:
   receiving the user input via a user authentication display.

5. The method of claim 3, further comprising:
   detecting the user input in a particular path on the lock screen of the mobile terminal.

6. The method of claim 3, further comprising:
   detecting the user input at a specific one of the restricted user graphic and the non-restricted user graphic at a first location of the lock screen, the user input comprising:
      moving the specific one of the restricted user graphic and the non-restricted user graphic from the first location to a second location on the lock screen according to the detected user input in a specific direction.

7. The method of claim 3, further comprising:
   displaying a user authentication display to display the user input;
   detecting at least one key positioned separate from the user authentication display being manipulated to receive the user input.

8. The method of claim 3, further comprising:
   displaying a user authentication display comprising a plurality of keys to display the user input;
   detecting at least one of the plurality of keys being manipulated to receive the user input; and
   displaying the user input via the user authentication display.

9. The method of claim 1,
   further comprising:
   determining whether or not to perform the user authentication procedure based on which one of the restricted user graphic and the non-restricted user graphic is touch-dragged on the lock screen.

10. The method of claim 1, further comprising:
displaying the restricted user graphic in an allocated portion separate from the non-restricted user graphic on the lock screen of the mobile terminal.

11. The method of claim 1, further comprising:
detecting a touch input at a specific one of the restricted user graphic and the non-restricted user graphic on the lock screen of the mobile terminal; and
moving the specific one of the restricted user graphic and the non-restricted user graphic to a predetermined position on the lock screen according to the detected touch input,
wherein the predetermined position is common to both the restricted user graphic and the non-restricted user graphic.

12. The method of claim 1, further comprising:
detecting a touch input at a specific one of the restricted user graphic and the non-restricted user graphic on the lock screen of the mobile terminal; and
moving the specific one of the restricted user graphic and the non-restricted user graphic along a predetermined path to a predetermined position on the lock screen according to the detected touch input.

13. The method of claim 1, further comprising:
detecting a first touch input at one of the restricted user graphic and the non-restricted user graphic on the lock screen of the mobile terminal;
moving the one of the restricted user graphic and the non-restricted user graphic to a first predetermined position on the lock screen according to the detected first touch input;
detecting a second touch input at the other of the restricted user graphic and the non-restricted user graphic on the lock screen; and
moving the other of the restricted user graphic and the non-restricted user graphic along a predetermined path to a second predetermined position on the lock screen according to the detected second touch input.

14. The method of claim 1, wherein unlocking the mobile terminal comprises switching a user authentication display of the user authentication procedure directly to a second execution image of a second function associated with the restricted user graphic.

15. The method of claim 1, wherein at least the restricted user graphic or the non-restricted user graphic comprises at least a function icon, application icon or menu icon.

16. The method of claim 1, further comprising:
displaying an unlocked screen responsive to the unlocking the mobile terminal; and
displaying the non-restricted user graphic on the unlocked screen,
wherein the non-restricted user graphic on the unlocked screen is associated with the same first function as the non-restricted user graphic on the locked screen.

17. A method of controlling a mobile terminal, the method comprising:
displaying a lock screen to indicate the mobile terminal is in a locked state;
displaying a restricted user graphic and a non-restricted user graphic on the lock screen;
performing a user authentication procedure to authenticate a user responsive to user touch-dragging of the restricted user graphic on the lock screen such that the lock screen is switched to a user authentication display; and
skipping the user authentication procedure responsive to user touch-dragging of the non-restricted user graphic on the lock screen such that the lock screen is switched directly to a first execution image of a first function associated with the non-restricted user graphic without displaying the user authentication display.

18. The method of claim 17, further comprising switching the user authentication display directly to a second execution image of a second function associated with the restricted user graphic responsive to completion of the user authentication procedure.

19. A mobile terminal, comprising:
a touchscreen configured to display information; and
a controller configured to:
display a restricted user graphic and a non-restricted user graphic together on a lock screen on the touchscreen;
perform a user authentication procedure responsive to user touch-dragging of the restricted user graphic;
unlock the mobile terminal responsive to completion of the user authentication procedure; and
switch the lock screen directly to a first execution of a first function associated with the non-restricted user graphic without performing the user authentication procedure, the switch responsive to user touch-dragging of the non-restricted user graphic on the lock screen.

20. The mobile terminal of claim 19, wherein the controller is further configured to:
provide a virtual region hidden from view on the lock screen such that a touch input in a particular direction on the lock screen causes the virtual region to appear on the touchscreen.

21. The mobile terminal of claim 20, wherein the controller is further configured to:
display the restricted user graphic in the virtual region such that the touch input causes the restricted user graphic to appear on the touchscreen.

22. The mobile terminal of claim 19, wherein the controller is further configured to:
determine whether to perform the user authentication procedure based on which of the restricted user graphic and the non-restricted user graphic is touch-dragged on the lock screen.

23. The mobile terminal of claim 22, further comprising:
at least one key positioned separately from the touchscreen for receiving a user input with regard to the user authentication procedure.

24. The mobile terminal of claim 19, wherein the controller is further configured to:
detect a touch input at a specific one of the restricted user graphic and the non-restricted user graphic on the lock screen; and
move the specific one of the restricted user graphic and the non-restricted user graphic to a predetermined position on the lock screen according to the detected touch input,
wherein the predetermined position is common to both the restricted user graphic and the non-restricted user graphic.

25. The mobile terminal of claim 19, wherein the controller is further configured to:
detect a touch input at a specific one of the restricted user graphic and the non-restricted user graphic on the lock screen; and
move the specific one of the restricted specific user graphic and the non-restricted user graphic along a predetermined path to a predetermined position on the lock screen according to the detected touch input.

26. The mobile terminal of claim 19, wherein the controller is further configured to unlock the mobile terminal such that a user authentication display of the user authentication procedure is switched directly to a second execution image of a second function associated with the restricted user graphic.

27. The mobile terminal of claim 19, wherein at least the restricted user graphic or the non-restricted user graphic comprises at least a function icon, application icon or menu icon.

28. The mobile terminal of claim 19, wherein the controller is further configured to:
  display an unlocked screen responsive to the unlocking of the mobile terminal; and
  display the non-restricted user graphic on the unlocked screen,
  wherein the non-restricted user graphic on the unlocked screen is associated with the same first function as the non-restricted user graphic on the locked screen.

29. A mobile terminal, comprising:
  a touchscreen configured to display information; and
  a controller configured to:
    display a lock screen on the touchscreen to indicate the mobile terminal is in a locked state;
    display a restricted user graphic and a non-restricted user graphic on the lock screen;
    perform a user authentication procedure to authenticate a user responsive to user touch-dragging of the restricted user graphic on the lock screen such that the lock screen is switched to a user authentication display; and
    skip the user authentication procedure responsive to user touch-dragging of the non-restricted user graphic on the lock screen such that the lock screen is switched directly to a first execution image of a first function associated with the non-restricted user graphic without displaying the user authentication display.

30. The mobile terminal of claim 29, wherein the controller is further configured to switch the user authentication display directly to a second execution image of a second function associated with the restricted user graphic responsive to completion of the user authentication procedure.

31. A method of controlling a mobile terminal, the method comprising:
  displaying a restricted user graphic and a non-restricted user graphic together on a lock screen;
  receiving a user command of touch-dragging the restricted user graphic or the non-restricted user graphic on the lock screen;
  performing a user authentication procedure to authenticate the user if the restricted user graphic is touch-dragged on the lock screen; and
  switching the lock screen directly to an execution image of a specific function associated with the non-restricted user graphic without performing the user authentication procedure if the non-restricted user graphic is touch-dragged on the lock screen.

32. The method of claim 31, wherein performing the user authentication procedure comprises changing the lock screen into a user authentication display.

33. The method of claim 31, further comprising:
  moving the touch-dragged restricted user graphic or non-restricted user graphic to a predetermined position on the lock screen,
  wherein the predetermined position is common to both of the restricted user graphic and the non-restricted user graphic.

34. A mobile terminal, comprising:
  a touchscreen; and
  a controller configured to:
    display a restricted user graphic and a non-restricted user graphic together on a lock screen on the touchscreen;
    receive a user command of touch-dragging the restricted user graphic or the non-restricted user graphic on the lock screen;
    perform a user authentication procedure to authenticate a user if the restricted user graphic is touch-dragged on the lock screen; and
    switch the lock screen directly to an execution image of a specific function associated with the non-restricted user graphic without performing the user authentication procedure if the non-restricted user graphic is touch-dragged on the lock screen.

35. The mobile terminal of claim 34, wherein the controller is further configured to change the lock screen into a user authentication display for the user authentication procedure.

36. The mobile terminal of claim 34, wherein the controller is further configured to move the touch-dragged restricted user graphic or non-restricted user graphic to a predetermined position on the lock screen,
  wherein the predetermined position is common to both of the restricted user graphic and the non-restricted user graphic.

* * * * *